(12) United States Patent
Graf et al.

(10) Patent No.: US 7,802,893 B2
(45) Date of Patent: Sep. 28, 2010

(54) BULB REFLECTOR FOR THIN DIRECT LIT BACKLIGHTS

(75) Inventors: John Frederick Graf, Ballston Lake, NY (US); Dennis Joseph Coyle, Clifton Park, NY (US)

(73) Assignee: SABIC Innovative Plastics IP B.V. (NL)

( * ) Notice: Subject to any disclaimer, the term of this patent is extended or adjusted under 35 U.S.C. 154(b) by 200 days.

(21) Appl. No.: 12/121,950

(22) Filed: May 16, 2008

(65) Prior Publication Data

US 2009/0284970 A1 Nov. 19, 2009

(51) Int. Cl.
*G09F 13/04* (2006.01)
(52) U.S. Cl. ............ 362/97.1; 362/217.09; 362/246; 362/299; 362/340
(58) Field of Classification Search ........... 362/97.1, 362/97.2, 97.3, 217.08, 217.09, 237, 240, 362/246, 299, 300, 311.1, 340
See application file for complete search history.

(56) References Cited

U.S. PATENT DOCUMENTS

| | | | | |
|---|---|---|---|---|
| 3,701,896 A | * | 10/1972 | Pate | .................... 362/224 |
| 5,481,445 A | * | 1/1996 | Sitzema et al. | ............ 362/308 |
| 5,971,559 A | | 10/1999 | Ishikawa et al. | |
| 7,168,819 B2 | * | 1/2007 | Yen | .................... 362/29 |
| 7,213,933 B2 | | 5/2007 | Chang et al. | |
| 2005/0270654 A1 | | 12/2005 | Goto et al. | |
| 2006/0082016 A1 | | 4/2006 | Chang et al. | |
| 2007/0047228 A1 | | 3/2007 | Thompson et al. | |

OTHER PUBLICATIONS

Coyle, et al; "Light Management Films for LCD Backlighting"; GE Global Research Technical Information Series; 2007GRC570, 15 pages; May 2007.
International Search Report; International Application No. PCT/US2009/043430; International Filing Date: May 11, 2009; Date of Mailing: Jul. 31, 2009; 7 Pages.
Written Opinion of the International Searching Authority; International Application No. PCT/US2009/043430; International Filing Date: May 11, 2009; Date of Mailing: Jul. 31, 2009; 11 Pages.

* cited by examiner

*Primary Examiner*—Stephen F Husar
(74) *Attorney, Agent, or Firm*—Cantor Colburn LLP

(57) ABSTRACT

In one embodiment, a backlight assembly comprises: a bulb having a bulb first side and a bulb second side located on a side of the bulb opposite the first side, a reflector plate disposed on the bulb first side, and a front bulb reflector disposed over the bulb second side. The front bulb reflector has a partially reflective member capable of reflecting greater than or equal to 60% of light from the bulb toward the reflector plate, and an inner surface on a reflector second side located opposite the reflector first side. The overall geometry of the front bulb reflector is concave on the reflector second side and convex on the reflector first side.

16 Claims, 11 Drawing Sheets

BULB REFLECTOR FOR THIN DIRECT LIT BACKLIGHTS

BACKGROUND

A backlight illuminates a liquid crystal (LC) based display panel to provide light distribution over the entire plane of the LC display (LCD) panel. Typical direct-lit LCD backlights consist of individual fluorescent lamps placed in a reflecting cavity to directly shine light upwards towards and through the LCD panel.

A typical direct-lit LCD backlight has a diffuser plate to hide the individual lamps. The diffuser plate is typically filled with light-scattering particles, has a transmission of only about 55% and a transmission haze of over 99.6% to drastically scatter the light so that the individual lamps cannot be seen. On top of the diffuser plate is a "bottom diffuser" that is typically a plastic film coated with spheres and a binder, which aids in hiding the bulbs, but also turns or collimates the light somewhat in the direction of the viewer. Often a prism film is arranged on the diffuser plate, where the prism film has prisms running in a horizontal direction (direction parallel to the orientation of the lamps) to collimate the light strongly in the vertical direction (direction in the plane of the prism film and perpendicular to the horizontal direction). Typical applications for direct-lit backlights are in televisions, where it is acceptable to collimate the light vertically since viewers typically do not view from above or below the screen, while it is typical to not collimate horizontally since it is common to view the screen from side angles.

Diffuser plates are used in direct-lit flat panel displays because of their bulb hiding ability. It is possible to increase the absolute hiding power of a diffuser plate by adding more light scattering particles. However, there is a tradeoff between absolute hiding power and luminance. As more scattering particles are added, the scattered light travels a greater distance through the diffuser plate with a corresponding increase in absorption. Secondly, as more scattering particles are added, the diffuser plate reflects more light with the additional probability of being absorbed. Therefore, increasing the scattering particles of a diffuser plate will increase the absolute hiding power but only after a significant loss in luminance due to absorption. The current objective in the display industry is to manufacture thinner displays and to remove bulbs; therefore it is desirable to consider alternative backlight designs that will achieve both the luminance and absolute hiding power in Ultra-Thin displays and Ultra-Thin displays with fewer bulbs.

BRIEF SUMMARY

Disclosed herein are front bulb reflectors, bulbs comprising the front bulb reflectors, backlight display assemblies, and methods of making the same.

In one embodiment, a backlight assembly comprises: a bulb having a bulb first side and a bulb second side located on a side of the bulb opposite the first side, a reflector plate disposed on the bulb first side, and a front bulb reflector disposed over the bulb second side. The front bulb reflector has a partially reflective member capable of reflecting greater than or equal to 60% of light from the bulb toward the reflector plate, and an inner surface on a reflector second side located opposite the reflector first side. The overall geometry of the front bulb reflector is concave on the reflector second side and convex on the reflector first side.

In another embodiment, a backlight assembly comprises: a bulb having a bulb first side and a bulb second side located on a side of the bulb opposite the first side, a reflector plate disposed on the bulb first side, and a front bulb reflector disposed over the bulb second side. The front bulb reflector has an outward facing surface having a plurality of reflecting structures on a reflector first side, and an inner surface on a reflector second side located opposite the reflector first side. The plurality of reflecting structures are capable of reflecting light from the bulb toward the reflector plate. The overall geometry of the front bulb reflector is concave on the reflector second side and convex on the reflector first side.

In yet another embodiment, a backlight assembly comprises: a reflector plate, a plurality of bulbs positioned in front of the reflector, a front bulb reflector, and a diffuser plate positioned on a side of the front bulb reflector opposite the plurality of backlight. The front bulb reflector comprising an outward facing surface curved over and positioned partially around each of the plurality of bulbs, the outward facing surface having a plurality of reflecting structures radially arranged upon the outward facing surface to reflect light towards the reflector plate, and an inner surface facing the plurality of bulbs.

In still another embodiment, a front bulb reflector for direct lit backlights comprising: an outward facing surface having a plurality of reflecting structures on a first side of the front bulb reflector, the plurality of reflecting structures capable of reflecting greater than or equal to 60% of the light back through the front bulb reflector, and an inner surface on a second side of the front bulb reflector opposite the first side. The overall geometry of the front bulb reflector is concave on the second side and convex on the first side.

The above described and other features are exemplified by the following Figures and detailed description.

BRIEF DESCRIPTION OF THE DRAWINGS

Refer now to the Figures, which are exemplary embodiments, and wherein the like elements are numbered alike.

DETAILED DESCRIPTION

Figure 1:
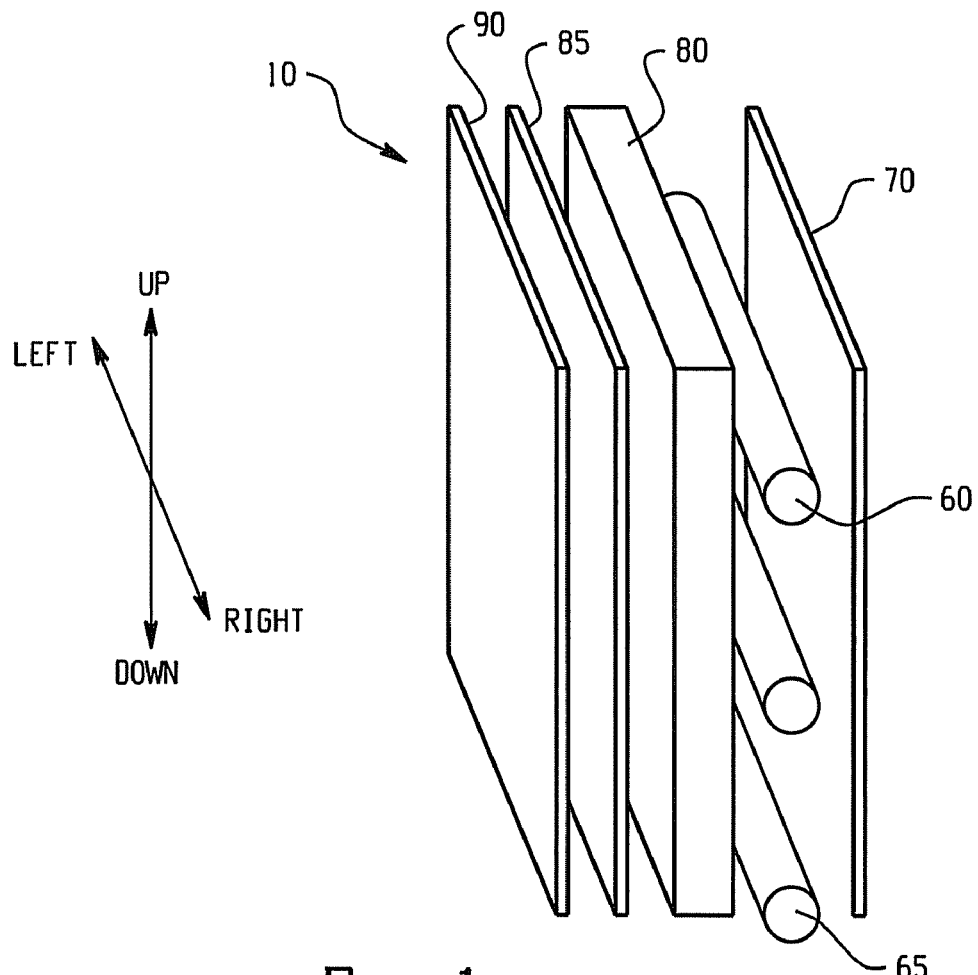
FIG. 1 is a side view of the layout of a direct-lit backlight module for a liquid crystal display screen.

The front bulb reflector described herein addresses the display industry's desire to manufacture thinner displays and/or to remove bulbs for cost saving and reduced power usage that is possible only with the inclusion of the front bulb reflector. The front bulb reflector when used within backlight designs achieves both the luminance and absolute hiding power requirements in an Ultra-Thin display as defined by a separation of less than 15 mm between the rear reflector and the backlight diffuser plate ("separation distance"). Ultra-Thin displays with fewer bulbs are defined as a bulb separation of greater than 25 mm in addition to the separation distance of less than 15 mm. The front bulb reflector will preferentially reflect, towards the back reflector panel of the backlight, greater than or equal to 60%, specifically, greater than or equal to 75%, or more specifically, greater than or equal to 80%, of the light that is being directly emitted by the bulb towards the viewer It is understood that the upper limit of the reflectivity is an amount above which a dark area would be formed over the bulb due to insufficient light being transmitted through the front bulb reflector to the viewer. This upper limit is less than 100% and may be less than 95% or even less than 90%.

In one embodiment, a front bulb reflector can comprise: an outward facing surface having a plurality of reflecting structures on a first side of the front bulb reflector, the plurality of reflecting structures capable of reflecting greater than or equal to 60% of the light back through the front bulb reflector; and an inner surface on a second side of the front bulb reflector opposite the first side; wherein the overall geometry is concave on the second side and convex on the first side. The reflecting structures can have an apex angle of 60 to 120 degrees. The apex angle can optionally change across the first side, e.g., the apex angle can decrease toward a center of the first side. The apex angle can be 80 to 110 degrees. Optionally, the inner surface has no reflecting structures.

In another embodiment, a front bulb reflector for direct lit backlights comprises: an outward facing surface having a plurality of channel contours formed in the plate and configured to correspond to and partially surround a front half portion of a backlight bulb, the outward facing surface on the plurality of channel contours having a plurality of reflecting structures radially arranged upon the outward facing surface and capable of reflecting light back through the front bulb reflector. The overall geometry can be convex on the outward facing surface. The reflector plate can further comprise a trough portion of the plate, and the plurality of reflecting structures can be parabolas and/or polygons (e.g., prisms).

In one embodiment, a backlight assembly can comprise: a backlight bulb, a reflector plate disposed on one side of the backlight bulb, and a front bulb reflector disposed over an opposite side of the backlight bulb opposite the first side. The front bulb reflector has a partially reflective member capable of reflecting greater than or equal to 60% of light from the bulb toward the reflector plate, and an inner surface on a reflector second side located opposite the reflector first side. The overall geometry of the front bulb reflector is concave on the reflector second side and convex on the reflector first side. The backlight assembly can further comprising a diffuser plate having a thickness of less than or equal to 2 mm, or, specifically, less than or equal to 1, and disposed on a side of the front bulb reflector opposite the backlight bulb and located less than or equal to 15 mm from the back reflector plate. The backlight assembly can have an absolute hiding power of less than 5, or specifically, less than or equal to 3, or, more specifically, 1.6±1.2, when viewed through the diffuser plate covering the plurality of front bulb reflectors. Optionally, the backlight assembly can further comprise an additional film selected from prismatic film, light collimating film, diffusing film, reflective recycling light polarizer film, and combinations comprising at least one of the foregoing films. Optionally, the backlight assembly can further comprise a plurality of the bulbs, wherein the front bulb reflector is positioned partially around each of the plurality of bulbs.

In another embodiment, a backlight assembly can comprise: a reflector plate, a plurality of backlight bulbs positioned in front of the reflector, a front bulb reflector, and a diffuser plate positioned on a side of the front bulb reflector opposite the plurality of backlight bulbs and disposed at a distance of less than 15 mm from the back reflector plate. The front bulb reflector can comprise: an outward facing surface curved over and positioned partially around each of the plurality of backlight bulbs, the outward facing surface having a plurality of reflecting structures radially arranged upon the outward facing surface to reflect light towards the reflector plate; and an inner surface facing the plurality of backlight bulbs. The backlight assembly can further comprise a microlens diffuser film located on a side of the diffuser plate opposite the front bulb reflector, wherein the diffuser plate is positioned less than or equal to 15 mm from the back reflector plate and wherein the plurality of backlight bulbs are positioned greater than or equal to 20 mm apart from each other.

In yet another embodiment, a backlight assembly can comprise: a bulb having a bulb first side and a bulb second side located on a side of the bulb opposite the first side, a reflector plate disposed on the bulb first side, and a front bulb reflector disposed over the bulb second side. The front bulb reflector has an outward facing surface having a partially reflective member capable of reflecting greater than or equal to 60% of light from the bulb back through the front bulb reflector such that no virtual image of the bulb is formed on a side of the front bulb reflector opposite the bulb, and an inner surface on a reflector second side located opposite the reflector first side, wherein an overall geometry of the front bulb reflector is concave on the reflector second side and convex on the reflector first side. The backlight assembly can further comprise a diffuser plate disposed on a side of the front bulb reflector opposite the bulb, and a ratio of bulb hiding difficulty of less than or equal to 0.35, or, specifically, less than or equal to 0.3. The backlight assembly can also, or alternatively, have an absolute hiding power of less than or equal to 3% when viewed through the diffuser plate covering the plurality of front bulb reflectors. This backlight assembly can comprise additional film(s) selected from the group consisting of prismatic film, light collimating film, diffusing film, reflective recycling light polarizer film, and combinations comprising at least one of the foregoing films. The front bulb reflector can be located such that the front bulb reflector does not interfere with light being reflected back toward the reflector plate. The front bulb reflector can be located directly adjacent to but not in physical contact with the bulb.

FIG. 1 presents a direct-lit back light display that shows a film stack configuration 50. At the back of the display 50 is a series of horizontal cold cathode florescent lamps (CCFL) 60. Behind the bulbs 60 is a flat plate 70 that has a matte surface that reflects 94% of the light at all the visible wavelengths. The diffuser plate 80, which is positioned in front of the bulbs 60 (e.g., having a thickness of 0.4 to 2 millimeter (mm), or so), and highly scatters light, e.g., with a haze of greater than or equal to 95%, (e.g., 99.5%). The plate's 80 function is to hide the individual bulbs 60, provide uniformity of the emerging light, and to provide structural support for the film stack 50. FIG. 1 is a schematic illustrating an embodiment of an optical display assembly 10. The optical display assembly includes a light provider 60, an optical diffuser plate 80, optical films 85 and 90.

Right in front of the diffuser plate 80 are two diffuser films 85 and 90. Each film is approximately 0.13 mm thick and acts as a moderate diffuser with a 98% haze (i.e., a haze measured by transmission according to Equation 2 of ASTM D1003-00, Procedure A; also referred to as "transmission haze"). Unless specifically set forth herein otherwise, all haze is measured in accordance with ASTM D1003-00, Procedure A with illuminant C. The next component in the display located in front of the diffuser films (not shown in FIG. 1) is the liquid crystal display panel 95 which includes a polarizing film 96 liquid crystal pixels 97, followed by another polarizing film 98 turned 90 degrees relative to the first. Additionally, a reflective recycling light polarizer film (e.g., reflective recycling light polarizer film; not shown) can optionally be inserted between the diffuser films and the liquid crystal display (desirably but just before the liquid crystal display) to improve the luminance performance of the display.

The light provider 60 includes a reflector 70, and a number of light sources 65. The light sources 65 can be, for example, lamps such as cold cathode florescent lamps (CCFLs). The light sources 65 are oriented parallel to each other and along a horizontal direction from left-to-right as shown in FIG. 1. The up and down or vertical direction is a direction in the plane of the light sources 65, but perpendicular to the horizontal left-to-right direction. While FIG. 1 illustrates three light sources 65 for illustration purposes, in general, the number of light sources 65 will be much larger then three.

Figure 2:
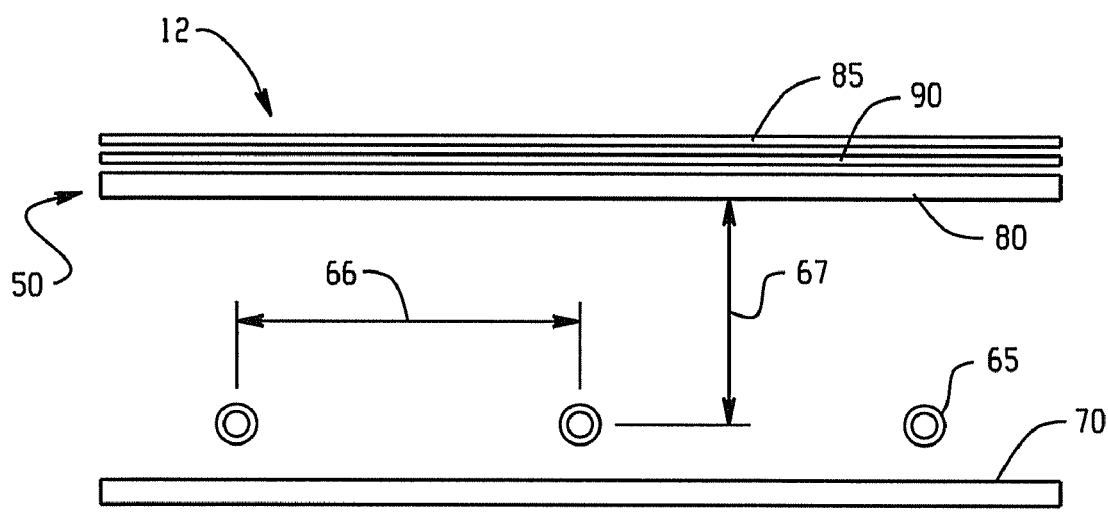
FIG. 2 is a cross-sectional illustration of a direct-lit backlight module for a liquid crystal display.

FIG. 2 is an illustration of a light provider 12 with light sources 65 (CCFLs) for explaining absolute hiding power. The term "absolute hiding power" as used herein refers to the ability of light diffusing films to mask the light and dark pattern produced by, for example, the light sources 65, such as the linear array of CCFLs shown in FIG. 2. Quantitatively, hiding power can be mathematically described by FIG. 2 and the following equation:

$$\text{Hiding power}(\%) = \left| 1 - \frac{\sum_{i=1}^{n-1} L_i(\text{over})}{\sum_{j=1}^{n-1} L_j(\text{between})} \right| \times 100$$

where $L_i(\text{over})$ is the luminance directly above one of the lamps, and $L_j(\text{between})$ is the luminance directly above a midpoint between lamp j and lamp j+1, and n is the number of lamps. Luminance values that are used to calculate hiding power ($L_i(\text{over})$ and $L_j(\text{between})$) are measured along the points on vertical y axis, where x coordinate is equal to 0, where "1" is the length of CCFL lamp as shown in FIG. 1. The average luminance is defined in relation to a 13 points test determined per Video Electronic Standard Association (VESA) flat panel display measurements (FPDM) version 2.

Figure 4A:
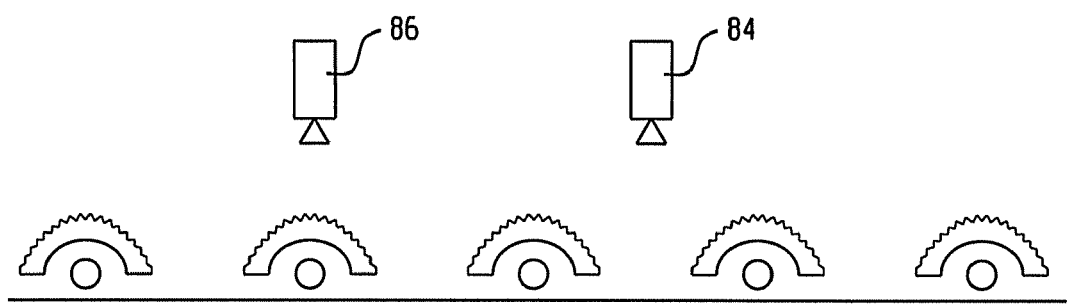
FIG. 4A shows the when the detector is considered to be reading over bulb and between bulb during measurement gathering.

FIGS. 2 and 4A illustrates n lamps. The luminance is measured on the side of the diffusing film 80 opposite to the light provider 65. The point between adjacent lamps 84 is relatively darker in comparison to a point above a lamp 86. Thus, in general the Lj(between) 84 values will be less than the Li(over) 86 values, and thus the summation of the Li(over) 86 will be greater than the summation of the Lj(between) 84. If a light diffusing film 80 perfectly hides the lamps 65, then the Lj(between) 84 values will be the same as the Li(over) 86 values, and the hiding power has a value of 0%. In general the hiding power can have a positive or a negative value. Often the value of importance for the hiding power is the absolute value of hiding power, or absolute hiding power. The bulb separation distance 66, as it is decreased, produces a lower absolute value of hiding power and as the distance between the diffuser plate and bulbs 67 increases the lower the absolute value of hiding power, but the thicker the display 50.

EXAMPLES

An optical model was used to evaluate the optical performance. The optical model is based on a geometric ray-tracing program that uses a Monte Carlo geometric ray tracing technique. The bulb was modeled as a 3 mm diameter glass tube with a 2 mm diameter hollow core. The tube was assumed to be Clear Soda Lime Glass with a refractive index (RI) of 1.513 for 645 nanometers (nm) wavelength light. The back reflector panel 70 located behind the bulbs was also included in the optical model. The reflective properties of the reflector panel of a Westinghouse backlight were 94.1% as measured with a Macbeth 7000A color eye spectrophotometer. Gonio measurements showed that the reflector panel was not perfectly lambertian. These measurements were used to generate a reflector panel object in the optical model that matched the Gonio and Macbeth measurements of an actual reflector panel.

The input parameters for the detector system in the optical model included a spot size of 2 mm at the top of the film stack. The detector is located at 55 mm distance from the top of the film stack. For over-bulb measurements, the detector is positioned directly over top of the bulb when at zero degrees zenith. For the between-bulb measurements the detector is position between the bulbs. The rays (i.e. photons) fired by the Monte Carlo geometric ray tracing software program each have one unit of dimensionless energy. To achieve a low Monte Carlo sampling error, up to 120 million rays were used for each calculation.

Table 1 presents the calculated hiding power (HP) for three different types of backlight displays that each use a standard diffuser plate (DP) composed of 2 mm thick optical grade polycarbonate (polycarbonate absorption coefficient was assumed to be 0.0044 $mm^{-1}$) filled with Tospearl at a 0.56% concentration (0.56 wt % Tospearl based upon the total weight of the film) and a transmission of 50.4%. The hiding power was calculated for three different display types including: (A) Control Display, (B) Ultra Thin Display, and (C) Ultra Thin & Fewer Bulb Display. To achieve adequate bulb hiding in a display, the measured absolute hiding power needs to be less than or equal to 2%. The calculated hiding power of −10.8% for the ultra-thin display (B) and −19.2% for the ultra-thin display with fewer bulbs (C), is not acceptable. Furthermore, acceptable bulb hiding would not be achieved by simply adding several micro-lens diffuser films 85, 90 on top of the already-present diffuser plate 80. The difference in hiding power between the display types demonstrates that the ability of a diffuser plate 80 (and film stack 50) to hide bulbs 65 depends not only on it's own diffusive scattering properties but also on the characteristics of the backlight 10 that it is located in.

TABLE 1

| Display Type | Distance Between Bulbs (Mm) | Distance From Diffuser Plate To Bulb (Mm) | Ratio Of Distance From Diffuser Plate To Bulb Divided By Distance Between Bulbs | Calculate % HP For 2 mm Standard Diffuser Plate |
| --- | --- | --- | --- | --- |
| A) Control Display | 25 | 20 | 0.8 | −0.4 ± 1.5 |
| B) Ultra-Thin Display | 25 | 7 | 0.28 | −10.8 ± 1.1 |
| C) Ultra-Thin Display with Fewer Bulbs | 32 | 7 | 0.22 | −19.2 ± 1.1 |

As is explained above, there is a desire in the display industry to manufacture thinner displays and to remove bulbs 65; therefore it is desirable to consider alternative backlight designs that will achieve both the luminance and absolute hiding power in Ultra-Thin displays and Ultra-Thin displays with fewer bulbs 65. It is possible to increase the absolute hiding power of a diffuser plate by adding more light scattering particles. However, there is a tradeoff between absolute hiding power and luminance. As more scattering particles are added, the scattered light travels a greater distance through the diffuser plate with a corresponding increase in absorption. Secondly, as more scattering particles are added, the diffuser plate reflects more light with the additional probability of being absorbed. Therefore, increasing the scattering particles of a diffuser plate will increase the absolute hiding power but only after a significant loss in luminance due to absorption.

Possible light scattering particles include materials that have the desired optical properties, including the desired refractive index. Desirably, these particles have sufficient compatibility with the matrix material and can be produced with the desired surface characteristics. Some possible particles include silsesquioxanes, both organic and inorganic (e.g., polyhydride silsesquioxanes, and so forth). Examples of polyorgano silsesquioxanes are polyalkyl silsesquioxanes where the alkyl groups have 1 to 18 carbon atoms, and can be saturated or unsaturated. Exemplary alkyl groups include methyl, ethyl, and branched, unbranched, and cyclic saturated C3 to C18 hydrocarbons (including cycloaliphatic hydrocarbons such as cyclopentyl and cyclohexyl), phenyl, vinyl, and so forth. Examples of silsesquioxanes include polymethyl silsesquioxanes, polyphenyl silsesquioxanes, polyphenyl-methyl silsesquioxanes, phenyl silsesquioxane-dimethyl siloxane copolymers in liquid form, polyphenyl-vinyl silsesquioxanes, polycyclohexyl silsesquioxanes, polycyclopentyl silsesquioxanes, and so forth.

Other possible types of light scattering particles are organic polymers such as, for example, fluorinated polymers (e.g., poly(tetrafluoroethylene)), and homopolymers, and copolymers formed from styrene and derivatives thereof, as well as acrylic acid and derivatives thereof, for example C1-8 alkyl acrylate esters, C1-8 alkyl methacrylate esters, and so forth. The copolymers can be derived from the copolymerization of acrylic acid with a derivative thereof; from the copolymerization of two or more different derivatives of acrylic acid (e.g., methyl methacrylate, butyl acrylate, and so forth); or from the copolymerization of acrylic acid and/or a derivative thereof with an ethylenically unsaturated compound such as styrene, a styrene derivative, acrylonitrile, or the like. Specific exemplary organic polymers include, but are not limited to poly(styrene), poly(acrylic acid), poly(methyl methacrylate), poly(acrylic acid-styrene) copolymers, and poly(C1-8 alkylacrylate-C1-8 alkylmethacrylate) copolymers, including core-shell polymers. In one embodiment, the polymers are crosslinked, for example crosslinked polyacrylic acid or crosslinked poly(C1-8 alkylacrylate-C1-8 alkylmethacrylate) copolymers. Combinations comprising one or more of the foregoing organic polymers can be used. Selection of the appropriate organic polymer, in particular those derived from styrene and derivatives thereof, as well as acrylic acid and derivatives thereof, allow adjustment of the refractive index from less than or equal to 1.589 (polystyrene only) to greater than or equal to about 1.49 (poly(methyl methacrylate) only).

Still another possible type of light scattering particle is inorganic, for example metal sulfates (such as barium sulfate, calcium sulfate, and so forth), metal oxides and hydroxides (such aluminum oxide, zinc oxide, silicon dioxide, and so forth), metal carbonates (such as calcium carbonate, magnesium carbonate, and so forth), metal silicates such as sodium silicate, aluminum silicate, and mica, clay, and so forth, as well as combinations comprising at least one of the foregoing inorganic materials.

Combinations comprising at least one of any of the above particles can also be employed.

An alternative approach that removes the loss of luminance from attempting to hide the bulbs through diffusion is to use the front bulb reflectors 100 that cause the light emitted from the bulbs 65 to be first reflected back towards the reflector panel 70. The light reflected off the back reflector panel 70 provides a more uniform light profile that initially reaches the diffuser plate 80. The front bulb reflector designs 100 and optical calculations demonstrate the feasibility of this approach in obtaining both the luminance and the absolute hiding power in ultra-thin displays and displays with fewer bulbs 65 spaced further apart 66.

The ability for the diffuser plate 80 to hide bulbs 65 in a backlight is dependent both on the properties of the diffuse plate 80 and the backlight 12. FIG. 2 presents a cross-sectional view of a 19 inch Westinghouse backlight showing the relative distances and locations of the bulbs 65, back reflector panel 70, diffuser plate 80 and film stack 50. The ability of the diffuser plate 80 to hide the bulbs 65 increases as the distance between the diffuser plate and bulbs 67 increases and as the bulb separation distance 66 decreases. The display industry's goals of thinner displays and displays with bulbs spaced further apart (i.e., fewer bulbs) makes it more difficult for the standard diffuser plate 80 to hide the bulbs 65. Table 2 presents the characteristics of a number of commercially available backlight assemblies. The ratio of the distance between the diffuser plate and the bulbs divided by the distance between bulbs is one way to describe the difficulty of bulb hiding for a particular backlight. This table shows that for a variety of commercial backlights, this ratio of "bulb hiding difficulty" range of 0.4 to 0.8 with the majority of backlights having a ratio of 0.5. As the value of this ratio approaches zero it becomes increasingly more difficult for a diffuser plate 80 to hide the bulbs 65.

opposite the front bulb reflector) and an inner surface 110 facing the backlight bulb 65. The reflecting structure 120 can be any geometric shape that effectively reflects light, including prisms, parabolas, portions of circles, cube-corners (e.g., triangular pyramid), trihedral, hemispheres, prisms, ellipses, tetragonal, grooves, channels, microlenses, and others, as well as combinations comprising at least one of the foregoing.

The reflector when including a reflecting structure 120 of a prism that can further comprise an apex angle of the reflecting structure of 60 to 120 degrees. The front bulb reflector 100 can be further modified by controlling a height 130 of the reflecting structure 120. The front bulb reflector 100 can further comprise a skew of the reflecting structure 120, wherein each reflecting structure of the plurality of reflecting structures 120 is controlled by the initial degrees for the apex angle, wherein the apex angle range is 80 to 100 degrees, the height and the skew determined by the radial location upon the outward facing surface 115 and are configured to increase the inward reflective properties at the radial location. The front bulb reflector 100 can be configured wherein the inner surface 110 is substantially smooth.

A front bulb reflector 100 can be made out of a low absorbing plastic or glass. An example of a front bulb reflector 100 is presented in FIG. 3 that shows the cross sectional view for front bulb reflector 100 design 90BA4 (3.0 mm). The dimension in the parenthesis following the design identification

TABLE 2

| Direct Lit BLM | Number of Bulbs | Height of Bulb (mm) | Bulb Separation Distance (mm) | Distance Between Back Reflector Plate and Bottom of Diffuser Plate | Ratio of Distance Between Diffuser Plate and Bulb Divided by Bulb Separation Distance |
|---|---|---|---|---|---|
| Coretronic 26 inch | 16 | 3.6 | 20.8 | 16.4 | 0.5 |
| Coretronic 37 inch | 20 | 4.2 | 22.7 | 19 | 0.5 |
| Hansol SEC 32 inch | 16 | 5.7 | 22.9 | 20.5 | 0.5 |
| LG Philips M3200C 32 inch | 18 | 6.2 | 21 | 21.3 | 0.5 |
| LG Philips 42 inch | 20 | 6 | 25 | 27 | 0.7 |
| Radiant Hannstar 23 inch | 12 | 3.6 | 23.4 | 16.7 | 0.4 |
| Samsung 32 inch | 16 | 6.47 | 23.4 | 21.87 | 0.5 |
| WestingHouse 19 inch | 12 | 3.3 | 25.3 | 25.4 | 0.8 |
| A) Control Display | 18 | 5 | 25 | 25 | 0.8 |
| B) Ultra Thin Display | 18 | 5 | 25 | 12 | 0.28 |
| C) Ultra Thin & Fewer Bulb Display | 14 | 5 | 32.1 | 12 | 0.22 |

As can be seen from Table 2, Configurations B and C had a "bulb hiding difficulty" that was substantially less than the commercially available systems. Configurations B and/or C had a ratio of "bulb hiding difficulty" of less than or equal to 0.35, or, specifically, less than or equal to 0.3, or, more specifically, less than or equal to 0.28, and even less than or equal to 0.25. The commercially available systems had a bulb hiding difficulty of greater than or equal to 0.4, and generally greater than or equal to 0.5.

Figure 3:
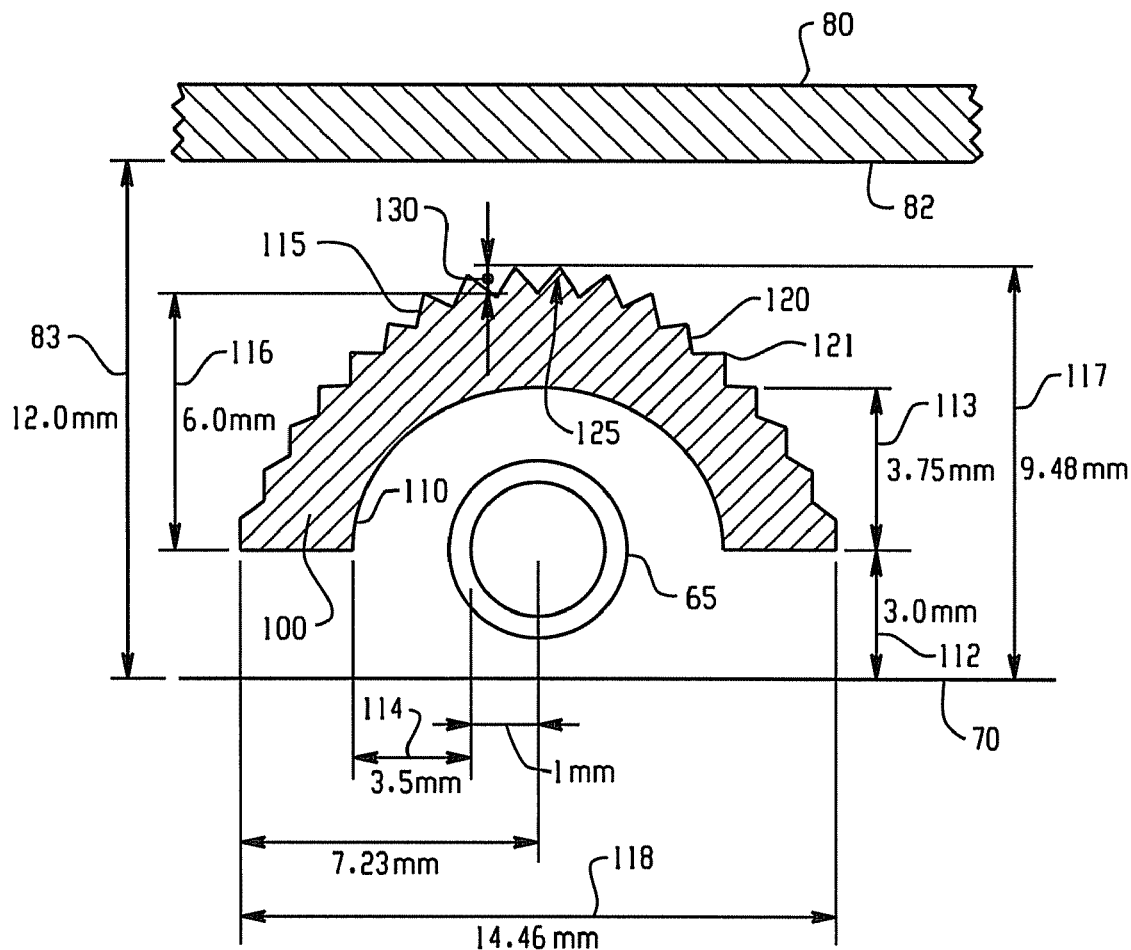
FIG. 3 is a cross-sectional illustration of one embodiment of front bulb reflector partially surrounding a bulb.
Figure 5:
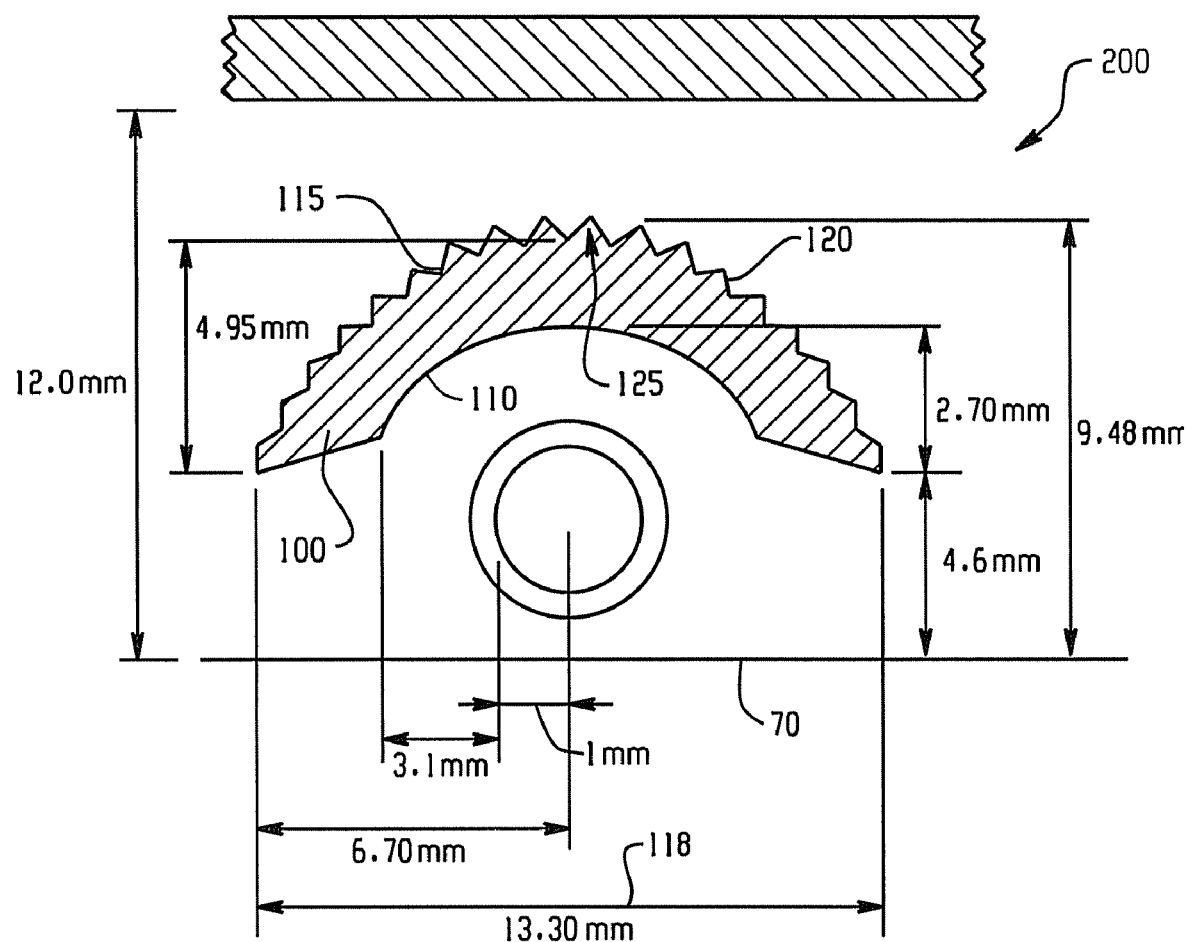
FIG. 5 is a cross-sectional illustration of one embodiment of front bulb reflector partially surrounding a bulb.
Figure 12:
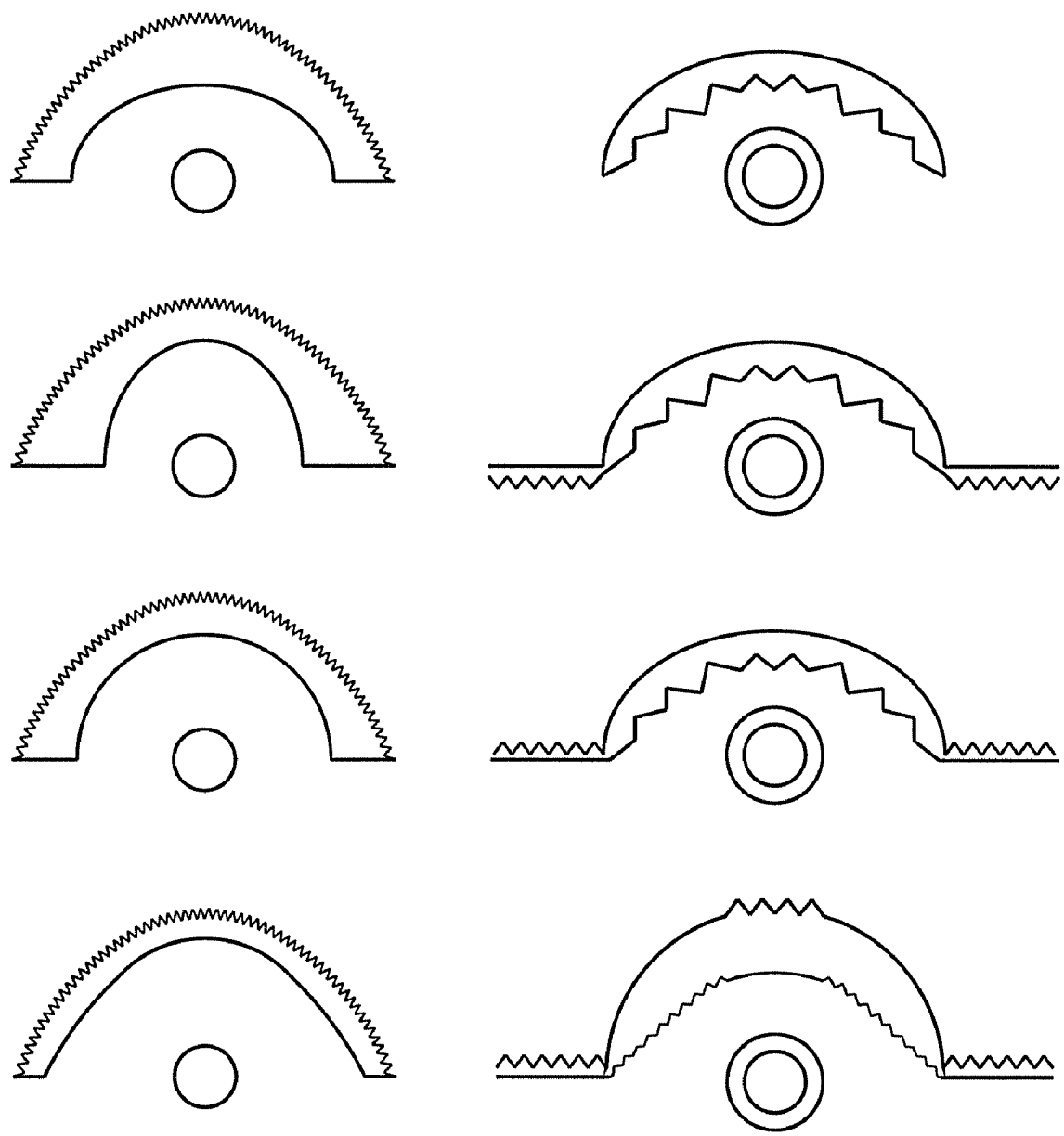
FIG. 12 displays a plurality of cross-sectional views of front bulb reflectors having desirable inward reflection properties.

A first embodiment comprises a front bulb reflector 100 for direct lit backlights 12 comprising a body 101 as shown in FIGS. 3, 5 and 12 that have an inward reflecting surface configured to be positioned over and partially surrounding a front portion of the backlight bulb 65. The front bulb reflector 100 can further comprise an outward facing surface 115 of the body 101 configured to be curved over and around the backlight bulb 65 having a plurality of reflecting structures 120, the plurality of reflecting structures radially arranged upon the outward facing surface 115 to reflect inwards (i.e., to reflect a portion of the light from the bulb back toward the bulb and the reflector 70 disposed on a side of the bulb name represents the front bulb reflector's location 112 (i.e. height) in the display 12. FIG. 3 presents the dimensions and location of the front bulb reflector 100 relative to the back reflector panel 70, light bulb 65, and the bottom 82 of the diffuser plate 80. This first example of a front bulb reflector 100 design can be made out of an optically grade thermoplastic with a refractive index of 1.59 and an absorption coefficient of 0.0044 mm$^{-1}$. The shape and surface features of the front bulb reflector 100 were designed so as not to include any undercuts that would make it difficult to produce the front bulb reflector 100 using a molding process.

The reflective functionality of the front bulb reflector 100 is controlled both by the texture of the inner surface 110 (closest to the bulb) and the prism texture 120 on the outer surface 115. The prism apex angle 125, height 130, and/or skew 135 can change depending upon the radial location 140; wherein the skew of the prism changes the shape from a standard equilateral (90° apex angle) or isosceles (less than 90° or greater than 90° apex angle triangle to a scalene triangle (no congruent sides). This complexity prevents a simple geometric ray tracing analysis of the front bulb reflector 100. It is therefore necessary to use a full optical model to assess the proposed front bulb reflector designs 100. The front bulb reflector 100 as shown by design example 90BA4(3.0 mm) has a location height 112 of 3.0 mm. The inner surface first vertical radius 113 measures 3.75 mm and second horizontal radius 114 measures 4.5 mm from bulb 65 center. The front bulb reflector 100 has a body height 116 of 6.0 mm to the base of the prism 120 and a reflector height 117 that is measured to the prism 120 having a tip 121 of 9.48 mm and a front bulb reflector width 118 measured at 14.46 mm. The diffuser plate height 83 is measured from the reflector 70 to the diffuser plate 80 of 12 mm.

Figure 4B:
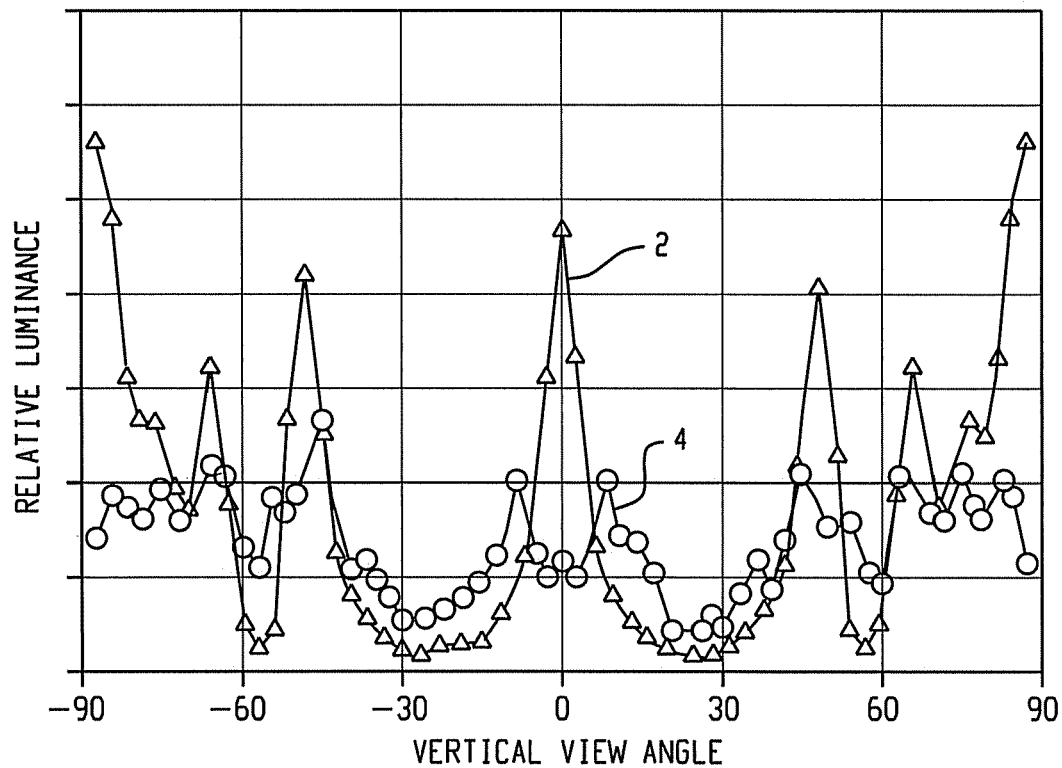
FIG. 4B is a chart comparing the luminance to vertical viewing angle with the detector over-bulb comparing output of luminance with (line 4) and without (line 2) front bulb reflectors.
Figure 4C:
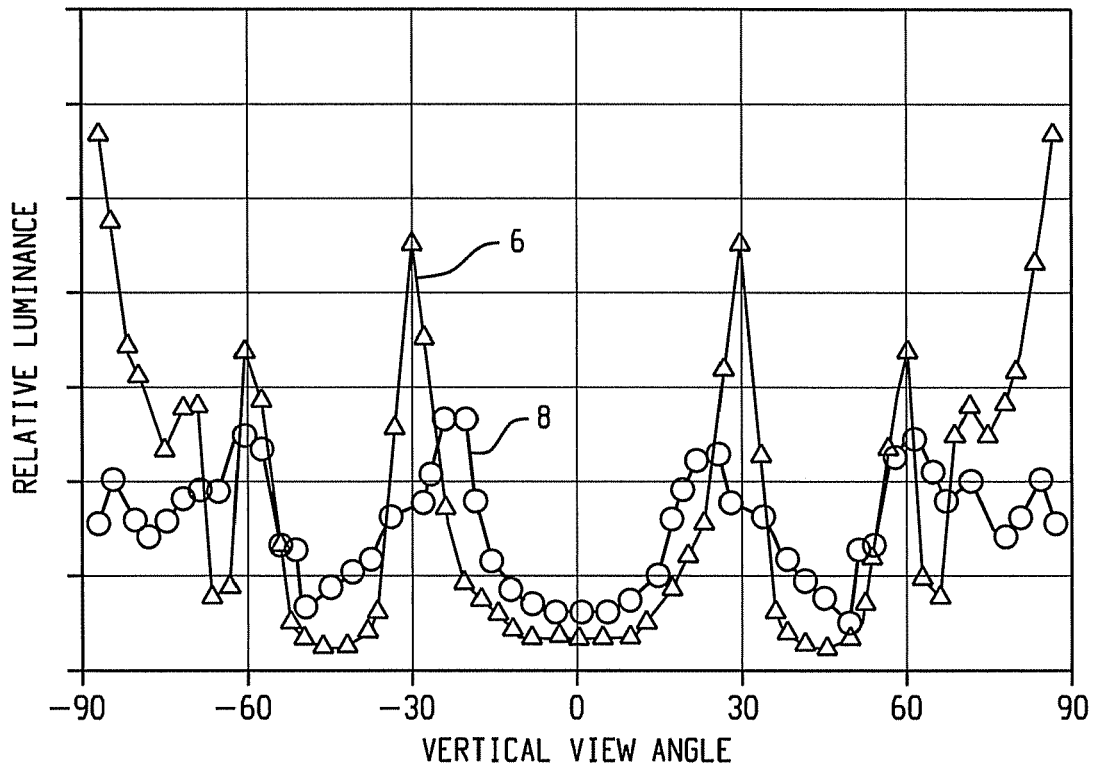
FIG. 4C is a chart comparing the luminance to vertical viewing angle with the detector between-bulb comparing output of luminance with (line 8) and without (line 6) front bulb reflectors.

FIGS. 4B (over bulb) and 4C (between bulb) present the optical model calculations of the vertical view luminance for a backlight 12 that uses the front bulb reflector elements 100 (lines 4,8) and for a control backlight 10 that does not use the front bulb reflector elements 100 (lines 2,6). The front bulb reflector 100 for this particular calculation is design 90BA4. The plots show that for the control (lines 2,6) there is significant reduction in peak luminance values and a corresponding increase in valley luminance with the addition of the front bulb reflector elements 100 (lines 4,8).

Figure 6A:
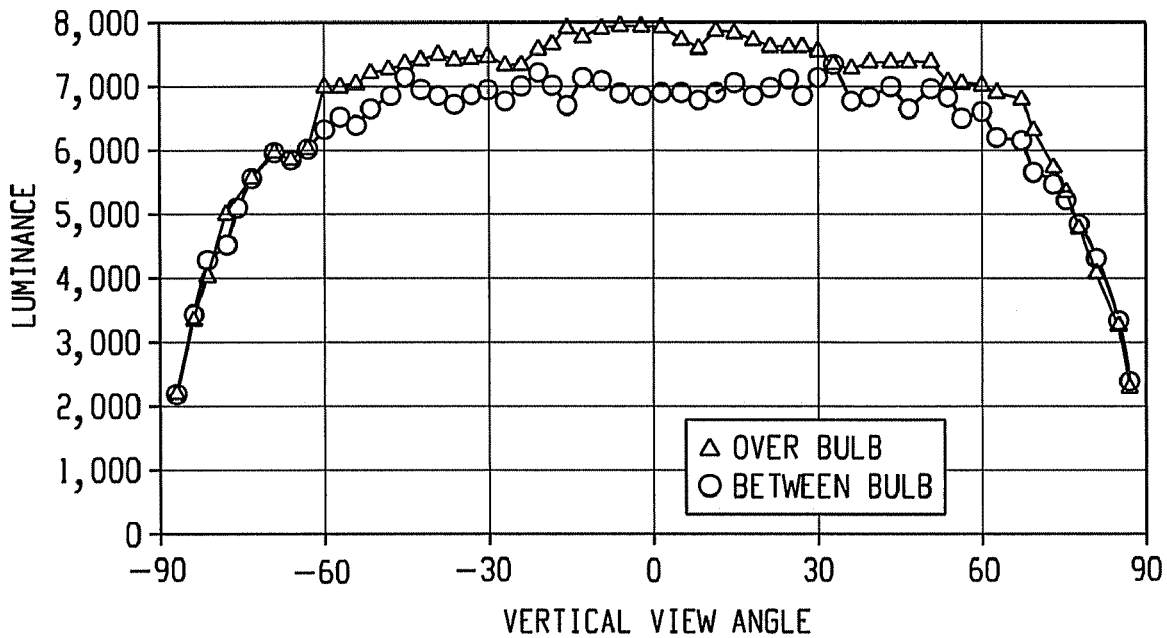
FIG. 6A is a graph comparing the luminance of a 2 mm diffuser plate positioned 12 mm from the rear reflector having a 25 mm bulb separation without the presence of a front bulb reflector.
Figure 6B:
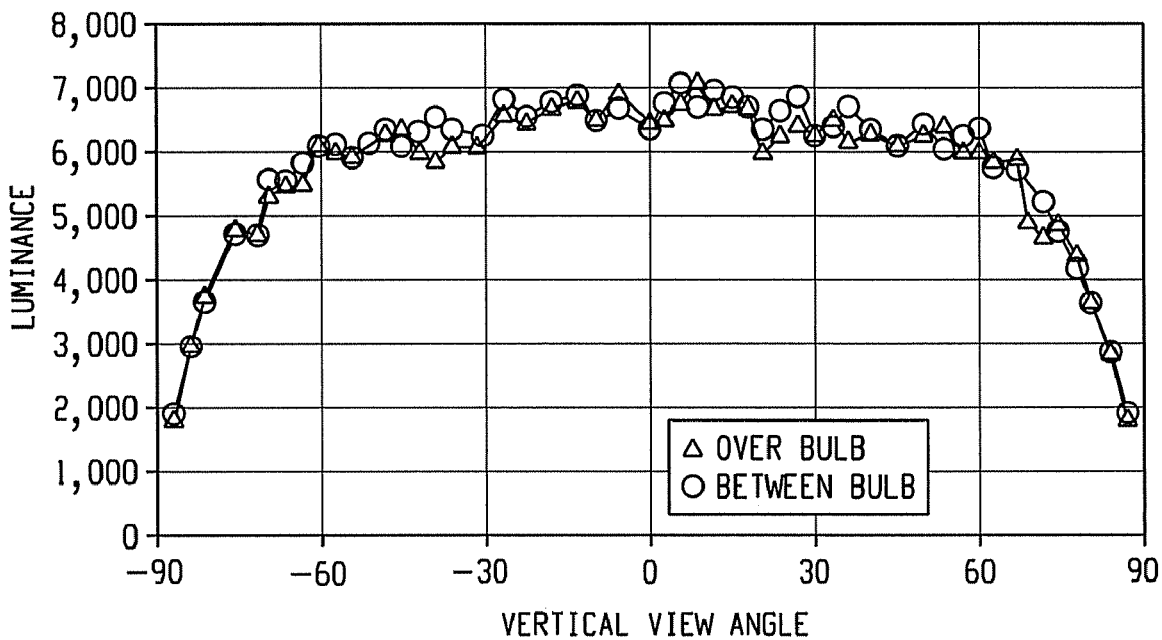
FIG. 6B is a graph comparing the luminance of a 2 mm diffuser plate positioned 12 mm from the rear reflector having a 25 mm bulb separation with the presence of a front bulb reflector defined as 90BA4_6580(3.0 mm).
Figure 7A:
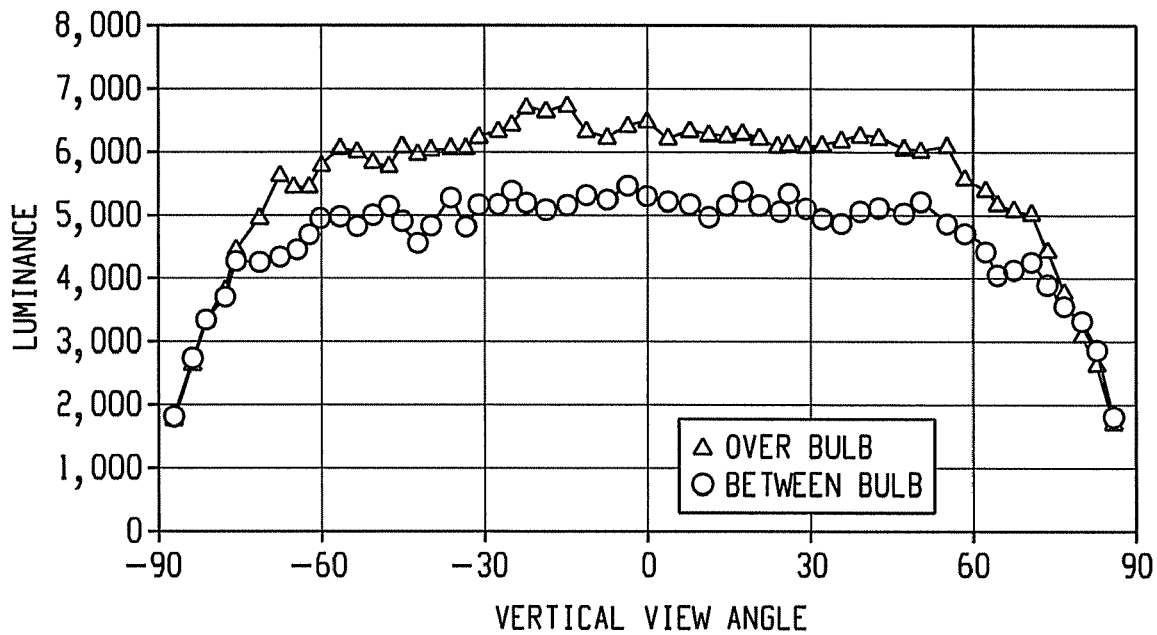
FIG. 7A is a graph comparing the luminance of a 2 mm diffuser plate positioned 12 mm from the rear reflector having a 32.1 mm bulb separation without the presence of a front bulb reflector when viewed from over bulb and between bulb positions.
Figure 7B:
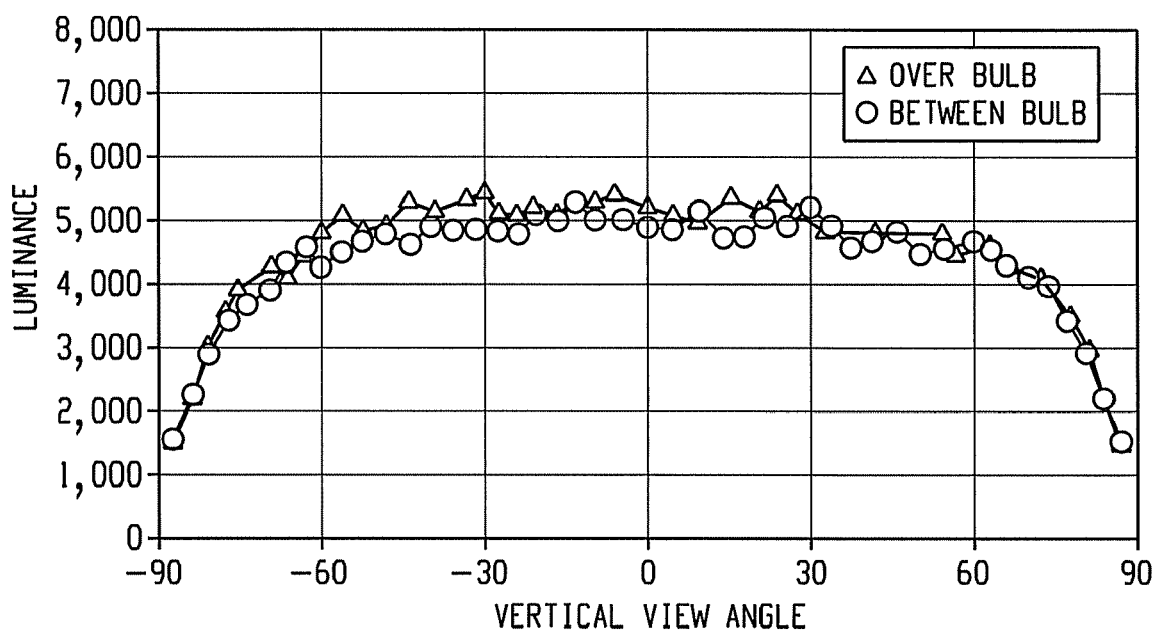
FIG. 7B is a graph comparing the luminance of a 2 mm diffuser plate positioned 12 mm from the rear reflector having a 32.1 mm bulb separation with the presence of a front bulb reflector defined as 90BA4_6580(3.0 mm) when viewed from over bulb and between bulb positions.

A second test example of the front bulb reflector 100 that was extensively evaluated was design 90BA4_6580 presented in FIG. 5. This design is a modification of the design 90BA4 by optimizing the arc length of the inner surface 110 facing the backlight bulb and the arc length of the outer surface 115 of the front bulb reflector that contains a plurality of prism structures. This arc length of both the inner and outer surfaces can be optimized for both luminance and absolute hiding power. Optical calculations for this design were run for both the Ultra Thin Display (B) and the Ultra Thin Display with Fewer Bulbs (C) configurations listed in Table 2 that used a standard 2 mm thick diffuser plate. The calculations were run without (control) and with the front bulb reflector. FIG. 6 presents the optical model calculation results for the Ultra Thin Display (B) showing a hiding power of 1.6±1.2 and −10.8±1.1 for the display with (FIG. 6B) and without (FIG. 6A) the front bulb reflector elements. The hiding power of 1.6 would be considered acceptable. The plot of the luminance over view angle in the figure demonstrates that the bulb hiding is good at all view angles. FIG. 7 presents the results for the Ultra Thin Display with Fewer Bulbs (C) showing a hiding of −4.1±1.1 and −19.2±1.1 for the display with (FIG. 7B) and without (FIG. 7A) the front bulb reflector elements. The hiding power of −4.1 is not acceptable for the display without further elements. However, the absolute hiding power is now low enough that acceptable bulb hiding could be achieved by adding two or three micro-lens diffuser films on top of the already present diffuser plate.

One embodiment disclosed herein is a backlight assembly 200 as shown in FIG. 5 that comprises a plurality of backlight bulbs 65 of a sufficient quantity and spacing to properly illuminate an LCD screen if installed. The backlight assembly 200 can be used in an LCD television or display when the next component installed in front of the diffuser films (not shown in FIG. 5) is the liquid crystal display panel 95 which includes a polarizing film 96, the liquid crystal pixels 97, followed by another polarizing film 98 turned 90 degrees relative to the first.

The backlight assembly 200 further includes a rear bulb reflector plate 70 having a matte surface finish is positioned and affixed behind the plurality of backlight bulbs 65 to direct the light in a forward or outward direction. A plurality of front bulb reflectors 100 configured to be curved over and around a front portion of each the plurality of backlight bulbs 65, the front bulb reflector 100 affixed to each of the plurality of backlight bulbs 65. The front bulb reflector 100 can be affixed to the bulb, to the backlight assembly housing if present or to the film stack 50 that includes the diffuser plate 80 at a portion outside of the viewing area.

The front bulb reflector 100 has an outward facing surface 115, the outward facing surface 115 has a plurality of geometric structures 120 that can include a plurality of prisms 120 starting with an apex angle 125 at the top of the front bulb reflector 100. The plurality of prisms 120 are radially arranged upon the outward facing surface 115 starting from the apex angle 125 and moving radially downwards to the bulb 65 to reflect inwards onto the rear reflector 70. There is an inner surface 110 facing the backlight bulb 65 that can be smooth or textured depending on the desired final optical properties of the front bulb reflector 100.

One example provided of the backlight assembly 200 described above when using the front bulb reflector 100 did not require a 2.0 mm diffuser plate, but a diffuser plate having a 0.4 mm thick polycarbonate film with light scattering particles (e.g., 0.56 wt % Tospearl particles, wherein the weight percent is based upon a total weight of the film), which is positioned 25 mm distance from the rear reflector plate 70. This 0.4 mm thick diffuser plate has the same concentration of light scattering particles as the 2.0 mm thick diffuser plate and thus has a corresponding loss in bulb hiding power (−4.8±1.2) when compared to the hiding power of the 2.0 mm thick diffuser plate (−0.4±1.5). When the front bulb reflector design 90BA4(see Example #6 in Table 3) was used with the 0.4 mm thick diffuser plate, the hiding power was significantly improved (2.1±1.1).

The inner surface 110 of the plurality of front bulb reflectors 100 is substantially smooth in this example tested. The apex angle 125 of the outward facing surface 115 is 90 degrees, wherein the backlight assembly 200 has a hiding power of 1.6±1.2 when viewed through the polycarbonate film 80 as described above covering the plurality of front bulb reflectors 100. The backlight assembly 200 comprising a front bulb reflector height 116 of about 4.95 mm±1 mm, a front bulb reflector width 118 of about 13.3 mm±2 mm, a pitch of the prisms of about 1.04 mm±0.1, and a height of the prisms of about 0.52 mm±0.05 mm. A clear plate 85, 90 having a micro-lens texture with a haze of 96% to 98% can be affixed above the plurality of front bulb reflectors 100 on top of the diffuser plate 80 to further direct the light path.

TABLE 3

| # | DP Thickness (mm) | Front Bulb Reflector Design | Front Bulb Reflector Height (mm) | Display Type (refer to Table 2) | Calculated Bulb Hiding Power % | Calculated Luminance (cd/m$^2$) | Hor. View (FWHM) | Ver. View (FWHM) |
|---|---|---|---|---|---|---|---|---|
| 1 | 2   |       | n.a. | A | −0.4 ± 1.5 | 7,345 ± 110 | 155.3 | 156.3 |
| 2 | 0.4 |       | n.a. | A | −4.8 ± 1.2 | 8,115 ± 46  | 150.4 | 155   |
| 3 | 0.4 | 60BA4 | 3.5  | A | 7.8 ± 1.1  | 7,384 ± 24  | 150.1 | 152.4 |
| 4 | 0.4 | 70BA4 | 3.5  | A | 9.8 ± 1.1  | 7,490 ± 32  | 149.2 | 152   |

TABLE 3-continued

| # | DP Thickness (mm) | Front Bulb Reflector Design | Front Bulb Reflector Height (mm) | Display Type (refer to Table 2) | Calculated Bulb Hiding Power % | Calculated Luminance (cd/m$^2$) | Hor. View (FWHM) | Ver. View (FWHM) |
|---|---|---|---|---|---|---|---|---|
| 5 | 0.4 | 80BA4 | 3.5 | A | 7.9 ± 1.1 | 7,596 ± 29 | 146.5 | 151.2 |
| 6 | 0.4 | 90BA4 | 3.5 | A | 2.1 ± 1.1 | 7,880 ± 24 | 144.8 | 151.7 |
| 7 | 0.4 | 100BA4 | 3.5 | A | 3.9 ± 1.1 | 7,737 ± 28 | 144.8 | 151.3 |
| 8 | 0.4 | 9060BA4 | 3.5 | A | 10.6 ± 1.1 | 7,542 ± 27 | 146.8 | 150.2 |
| 9 | 2 | | n.a. | B | −10.8 ± 1.1 | 7,422 ± 18 | 156 | 156.4 |
| 10 | 2 | | n.a. | B | −7.4 ± 1.2 | 7,032 ± 49 | 157.3 | 157.8 |
| 11 | 2 | | n.a | B | −6.3 ± 1.4 | 6,865 ± 64 | 157.5 | 157.4 |
| 12 | 2 | 90BA4_6580 | 2.5 | B | −1.6 ± 1.2 | 6,688 ± 34 | 156.5 | 156.4 |
| 13 | 2 | 90BA4_6580 | 3 | B | 1.6 ± 1.2 | 6,637 ± 36 | 156.1 | 156.1 |
| 14 | 2 | 90BA4_6580 | 3.5 | B | −2.1 ± 1.2 | 6,672 ± 38 | 156.1 | 156.5 |
| 15 | 2 | 90BA4 | 2.5 | B | −3.2 ± 1.1 | 6,484 ± 28 | 155.8 | 155.9 |
| 16 | 2 | 90BA4 | 3 | B | 1.4 ± 1.1 | 6,579 ± 15 | 156.1 | 156.5 |
| 17 | 2 | 90BA4 | 3.5 | B | 5.7 ± 1.1 | 6,643 ± 28 | 156.5 | 156.6 |
| 18 | 2 | 90BA4c | 3.5 | B | 13.0 ± 1.2 | 6,516 ± 42 | 156.7 | 156.3 |
| 19 | 2 | | n.a. | C | −19.2 ± 1.1 | 5,904 ± 20 | 156.7 | 156.7 |
| 20 | 2 | 90BA4_6580 | 2.5 | C | −9.4 ± 1.2 | 5,146 ± 27 | 156.1 | 156.6 |
| 21 | 2 | 90BA4_6580 | 3 | C | −4.1 ± 1.1 | 5,212 ± 12 | 156.4 | 156.4 |
| 22 | 2 | 90BA4_6580 | 3.5 | C | −5.1 ± 1.2 | 5,336 ± 27 | 156 | 156.3 |
| 23 | 2 | 90BA4 | 2.5 | C | −9.7 ± 1.2 | 5,139 ± 29 | 156.2 | 156.5 |
| 24 | 2 | 90BA4 | 3 | C | −7.6 ± 1.1 | 5,086 ± 10 | 156.3 | 156.4 |
| 25 | 2 | 90BA4 | 3.5 | C | −5.7 ± 1.2 | 4,980 ± 27 | 156.3 | 156.7 |
| 26 | 0.4 | | n.a. | B | −39.4 ± 1.1 | 8,245 ± 48 | 150.5 | 155 |
| 27 | 0.4 | 90BA4 | 3.5 | B | −6.4 ± 1.2 | 7,255 ± 39 | 145.1 | 152.3 |
| 28 | 0.4 | 90BA4c | 4.5 | B | 18.5 ± 1.3 | 7,685 ± 60 | 136.6 | 145.6 |
| 29 | 0.4 | 90BA4c | 3.5 | B | 23.4 ± 1.6 | 7,,619 ± 109 | 136 | 144.1 |
| 30 | 0.4 | 90BA4c | 2.5 | B | −7.7 ± 1.2 | 8,013 ± 53 | 135.5 | 143.8 |
| 31 | 0.4 | 90BA4cRF | 3.5 | B | 9.7 ± 1.5 | 7,468 ± 101 | 141.5 | 148.8 |
| 32 | 0.4 | 90BA4cRH | 3.5 | B | 13.3 ± 1.2 | 7,503 ± 48 | 141.9 | 148.3 |
| 33 | 0.4 | 110BA4 | 3.5 | B | −33.5 ± 1.7 | 7,711 ± 235 | 145.1 | 152.9 |

FWHM = full width at half maximum
cd/m$^2$ = candela per meter squared

Table 3 presents the results of the optical calculations for a number of different front bulb reflector designs and display configurations. Each calculation uses a single polycarbonate diffuser plate (DP) with 0.56 wt % Tospearl (except #10 and #11 which comprised 1.0 wt % and 2.0 wt % Tospearl, respectfully) in it at a thickness of 2 mm (haze of 99.6%) or 0.4 mm (haze of 96.3%). The optical performance of design 90BA4_6580 (3.0 mm) has already been presented for display type B (FIG. 6) and display type C (FIG. 7). However, the calculated data in this table presents the performance of this same design with the front bulb reflector located at different heights in the display for both the Ultra Thin Display (#12-14) and Ultra Thin Display with Fewer Bulbs (#20-22). This data illustrates the sensitivity in the optical performance as the height of the front bulb reflector varies over 1 mm.

Generally, the haze of the diffuser film, to attain the desired light scattering and hiding power, had to be greater than 99.6%. In the present system, however, due to the use of the front bulb reflectors, a haze of less than or equal to 99.5%, or, specifically, less than or equal to 99.0%, or, more specifically, less than or equal to 98.1%, can be employed while attaining the same or better hiding power and luminance. This reduction in required haze reduces the amount of light absorption by the diffuser film (therefore a brighter backlight display is attained), and a reduction in cost is realized due to the use of fewer scattering particles.

Table 3 tabulates calculated optical performance of design 90BA4 (see FIG. 3) for the three display types and at three different height locations. Of particular interest is configuration #6 that shows the performance of this design in the Control Display (A). This configuration uses a moderate diffuser plate that is represented by a 0.4 mm thick polycarbonate film with 0.56 wt % Tospearl particles. This moderate diffuser has a haze of 96.3% compared to a standard 2 mm thick plate with a haze of 99.6%. The control configuration #2 that uses the moderate diffuser plate but no front bulb reflector elements has a hiding power of −4.8±1.2. By adding bulb reflector elements of design 90BA4 to the display changes the hiding power to 2.1±1.1. This indicates that it might be possible to replace the moderate diffuser with a clear plate that has a micro-lens texture on it. Micro-lens textured plates and films tend to be moderate diffusers with hazes of 96% to 98%. But in addition to providing the necessary diffusion, the micro-lens textured plate would also collimate the light thus improving the on-axis luminance. In other words, by adding the bulb reflector elements to a standard backlight that uses a 2 mm diffuser plate and two micro-lens diffuser films, the 2 mm diffuser plate and one of the micro-lens diffuser films could be replaced with a clear plate with a micro-lens texture on it.

Figure 8:
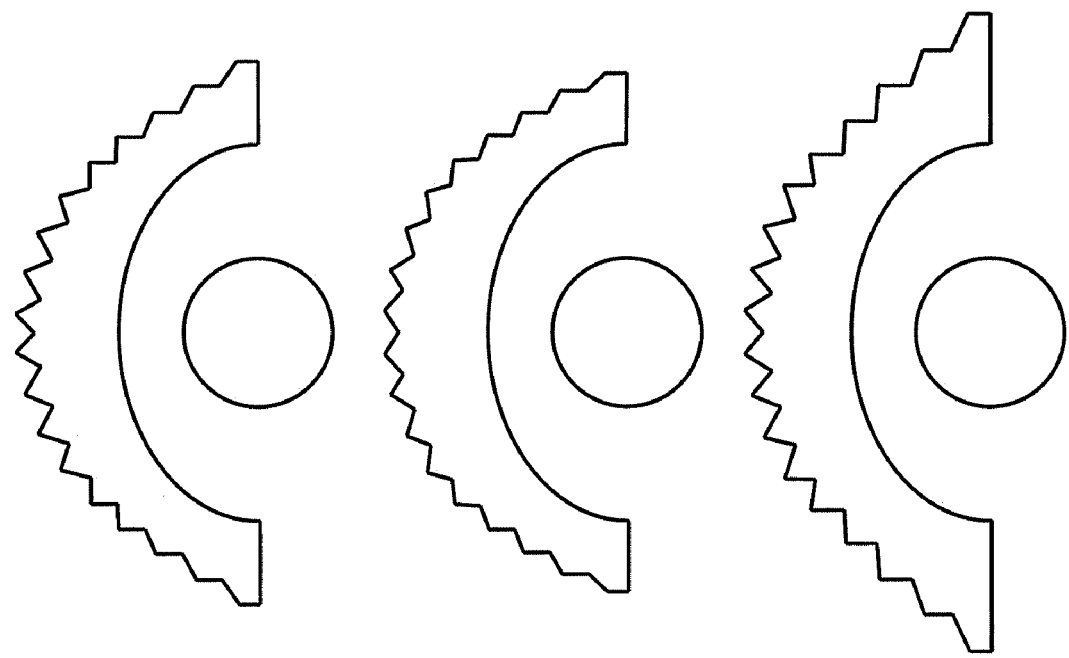
FIG. 8 displays some exemplary graphical profiles of the front bulb reflector displaying apex angles from 60 to 120 degrees.
Figure 8:
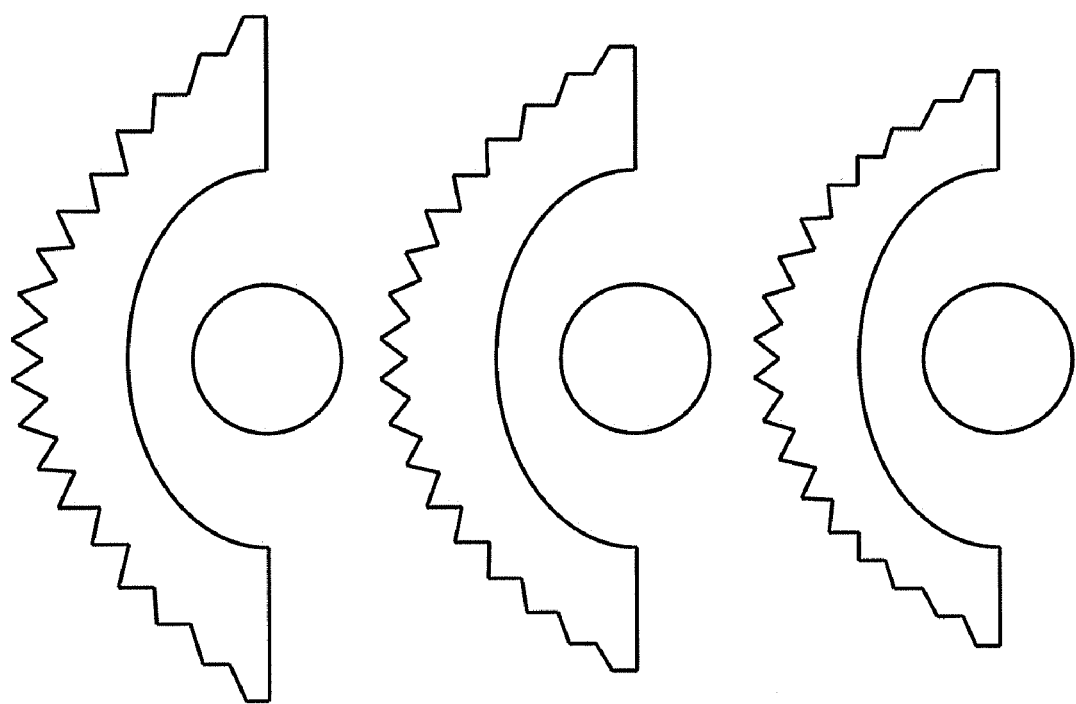
Figure 9:
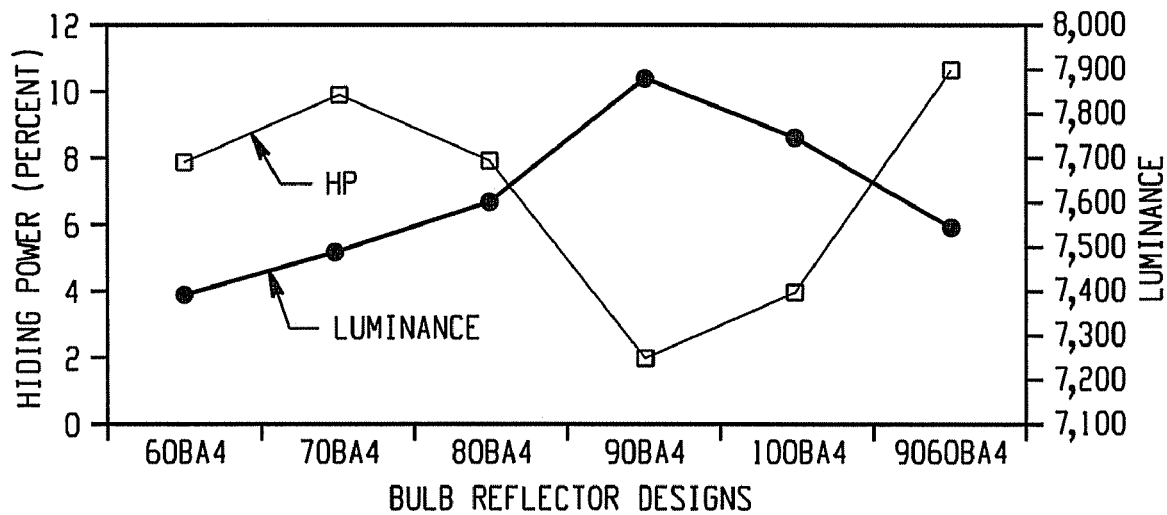
FIG. 9 displays a chart that corresponds the luminance and absolute hiding power of the front bulb reflectors according to their apex angles from 60 to 100 degrees.

FIG. 8 presents the bulb reflector designs (60BA4, 70BA4, 80BA4, 90BA4, 100BA4) that have respective peak prism apex angles of 60°, 70°, 80°, and 90°. The optical calculation results for these designs that are listed in Table 3 (Examples 3-8) are plotted in FIG. 9. The plot shows how the display luminance and bulb hiding changes with the change in prism apex angles. The plot shows that the 90BA4 design provides the highest bulb hiding (lowest absolute hiding power) and highest luminance. Thus a front bulb reflector with a prism apex angle of 90 degrees appears to be optimum for bulb hiding and luminance.

Figure 10:
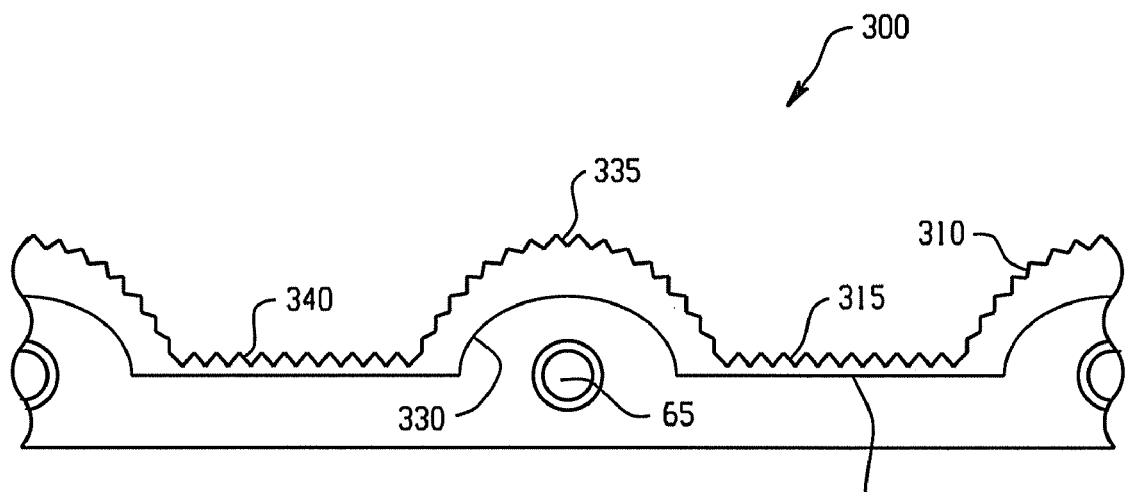
FIG. 10 displays a cross sectional view of a second embodiment displaying a front bulb reflector.
Figure 11:
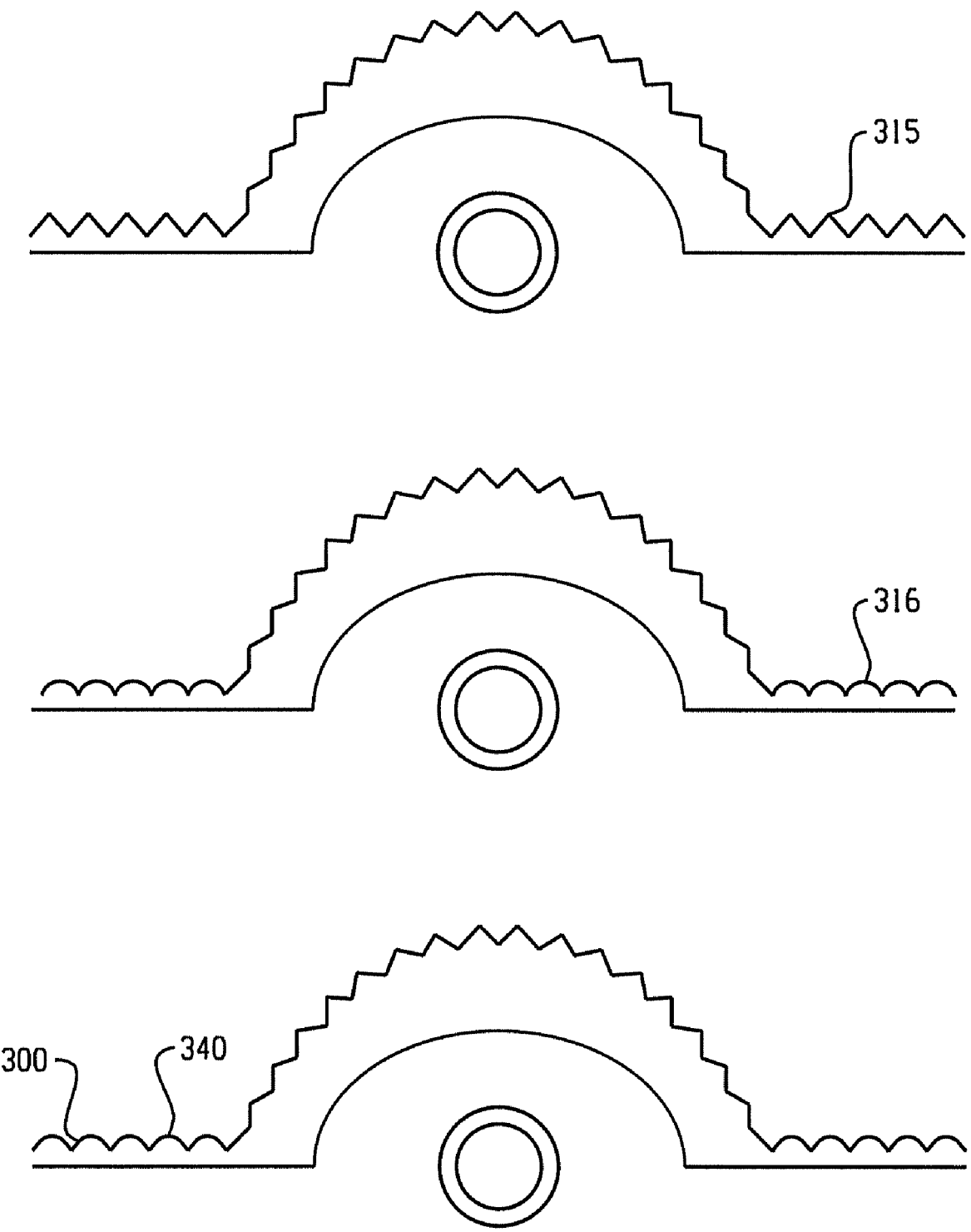
FIG. 11 displays a cross-sectional view of three different examples of a 90 degree apex angle prism on the front bulb reflector.

FIG. 10 presents a modification of the embodiment of a front bulb reflector design 200 illustrated in FIG. 5 by connecting the individual front bulb reflectors 100 into a single plate element 300. The example presented in FIG. 10 has a prism texture with a 1 mm pitch on the top (outer facing surface) of the plate portion 310, or trough 340 that connects individual bulb front reflector elements 100 (see FIG. 5). FIG. 11 presents three different designs. These three designs, 90BA4c, 90BA4cRF, and 90BA4cRH, have their calculated optical performances reported in Table 3 as configuration numbers 18 and 28-32.

Another enclosed embodiment is a front bulb reflector plate 300 having an outward facing surface 310 having a plurality of inward reflecting structures 315 arranged thereupon. The individual reflectors 100 of the other embodiment have been incorporated into a sheet or plate 300 for ease of assembly, construction and increased bulb hiding capacity. The plate 300 has an inner surface 320 facing the backlight bulbs 65. The plate 300 has a plurality of channel contours 330 that are formed into the plate 300 and configured to correspond to and partially surround a front half portion of the backlight bulbs 65. The outward facing surface 310 on the plurality of channel contours 330 also has a plurality of inward reflecting structures 315, but these are radially arranged upon the outward facing surface 310 of the channel contours 330. The inward reflecting structures 315 have been configured to both provide inward reflection, but also without any undercuts present to assist in demolding from an injection molding machine, which can be made from an optical grade of polycarbonate.

The reflector plate 300 in addition to the channel contours 330 also comprises a trough portion 340. The plurality of inward facing reflecting structures 315 are illustrated as prisms, wherein the prisms on the trough portion 340 have a 1 mm pitch texture. Optionally, the outward facing surface 310 can comprise the inward reflecting structures 315 on all or a portion thereof. For example, the trough portions can be the devoid of the inward reflecting structures, alternatively, less reflective structures can be employed in the trough portions 340 that on the convex portions located over the bulbs 65. For example, the trough portions 315 can have a reflectivity of less than or equal to 60%, or, specifically, less than or equal to 40%. The reflector plate 300 can also comprise a trough portion 340 of the plate wherein the plurality of inward facing reflecting structures 315 are configured as parabolas 316 as shown in FIG. 11. The reflector plate 300 further comprises an apex angle 335 of the inward reflecting structure 315 when it is a prism, which is located at the top of the channel 330, wherein the apex angle tested were 60 to 100 degrees. The prism 315 also comprises a height of the inward reflecting structure and a skew of the inward reflecting structure to tailor the reflective properties.

FIG. 12 presents examples of other types of design features that were considered during a brute force design search process. This computer search process consisted of varying different feature parameters using a design of experiment (DOE) approach to search for designs that showed interesting optical performance. The examples presented in FIG. 12 show some of the features that were considered.

Figure 13:
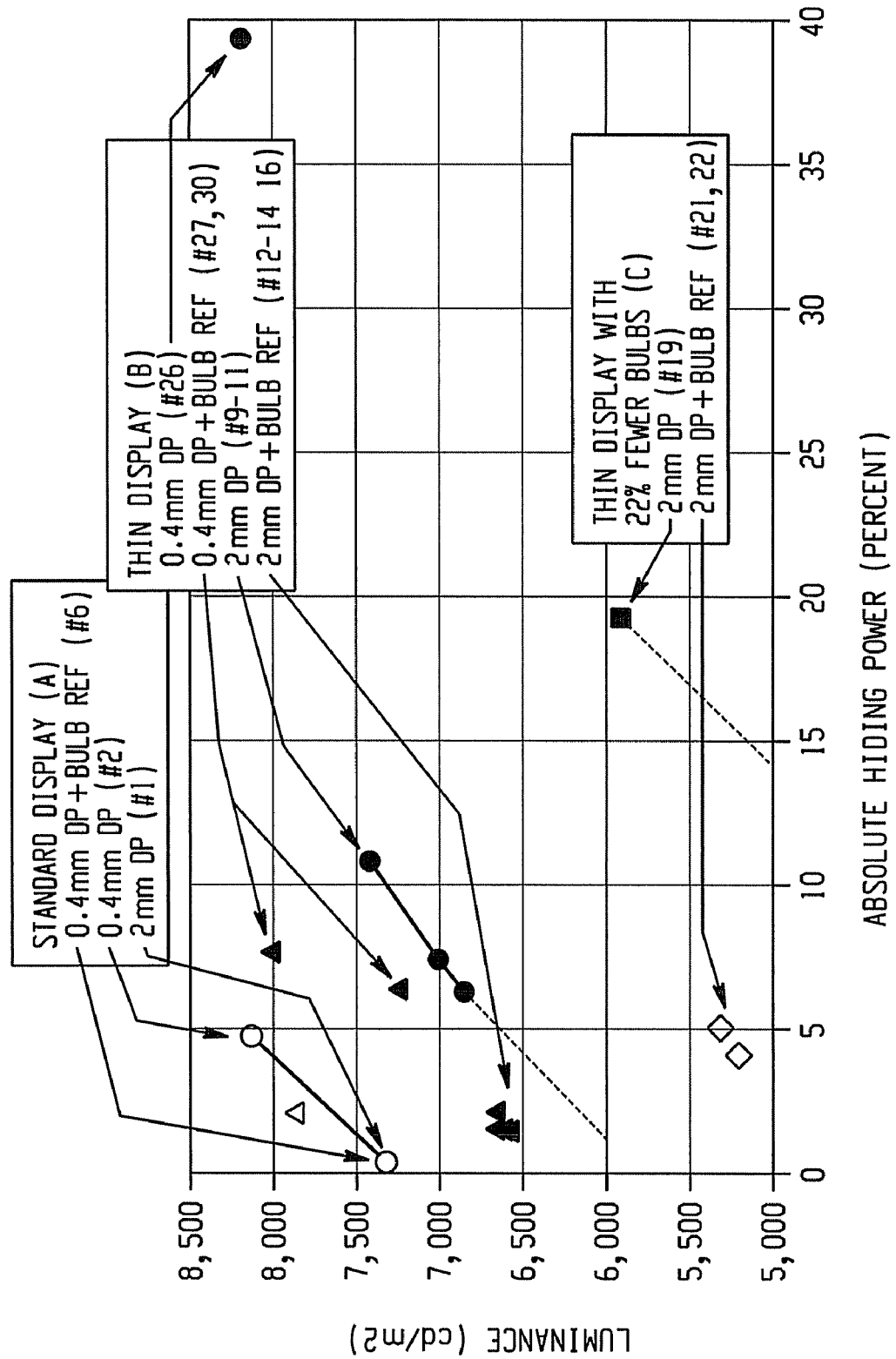
FIG. 13 displays a chart graphing the comparisons of the standard display, thin display and thin display with reduced bulbs.

FIG. 13 presents a summary of the performance of the more promising designs listed in Table 3, alongside their diffuser-plate-only reference configurations. It should be noted that the baseline luminance for the 18-bulb cases A and B is about 7,500 cd/m$^2$, while 14-bulb case C has only a 5,800 cd/m$^2$ potential at the same efficiency, which is probably not attainable with a standard scattering approach. The figure clearly shows the trade-off between luminance and hiding power. For a standard display A, the bulb-reflector approach only gives less than 5% advantage over conventional diffuser plates, so would not be worth pursuing. For the ultra thin display B the bulb reflector approach shows the potential for greater than 10% luminance gains. For the ultra thin display with fewer bulbs C, the calculations show that adequate hiding power cannot be achieved in any practical sense by simply adjusting diffuser plate thickness or particle concentration (scattering). The bulb reflectors approach shows potential for achieving adequate hiding power at high luminance. The blur efficiency of any diffuser is strong function of distance, so as the display is made thinner and the bulbs are spaced further apart the approach of a diffuser scattering the light becomes ineffective. An engineered-light-management approach, such as this bulb reflector concept, becomes particularly useful.

The front bulb reflector assembly can be manufactured via various processes, e.g., processes that can be employed to produce prismatic plates, such as injection molding, compression molding, coating, etc. The front bulb reflector can be formed from an optical grade material such as polycarbonate, polystyrene, acrylic, polyalkylenes, polycarbonates, acrylics, polyacetals, styrenes, poly(meth)acrylates, polyetherimide, polyurethanes, polyphenylene sulfides, polyvinyl chlorides, polysulfones, polyetherketones, cylic olefins, acrylonitrile-styrene, nylon, polyethylene terephthalate, polyphenylene ether, as well as combinations comprising at least one of the foregoing optical grade materials, such as optical grade polyphenylene ether-polystyrene.

The bulb reflector elements once produced could be held in place by several different approaches. They could be attached using clips directly to the bulb, to the sides of the backlight frame, and/or to the bottom reflector panel. Each bulb has its own front bulb reflector element and the entire set of elements could be linked together using a grid runner system to facilitate ease of assembly. Some designs above could be fabricated as a continuous sheet; essentially manufacturing each reflector element into a unitary front bulb reflector sheet. For example, a flat sheet with the desired textures on the inner and outer surfaces could be thermoformed into the proper shape.

As discussed above, the bulb reflector can be a unified plate capable of being located adjacent multiple bulbs, or can be a single plate having a shape complementary to the shape of a single bulb such that the distance between neighboring front bulb reflector elements 100 is the same distance as the bulb separation distance in a particular backlight. For example, the front bulb reflector has sufficient structural integrity to maintain a bowed shape (e.g., defined by a convex outer facing surface and a concave inner facing surface). In these embodiments, the front bulb reflector is disposed directly adjacent (i.e., no intervening elements (e.g., films or sheets)), but not in physical contact with the bulb. In other words, the display comprises, in order, the reflector plate(s), the bulb(s), a gap (e.g., air space), and then the front bulb reflector(s). Subsequent to the front bulb reflector(s), and in various arrangements, can be the diffuser film(s), prismatic film(s), reflective recycling light polarizer film(s), polarizing film(s), liquid crystal display, and/or any protective coating or film.

Some other embodiments of front bulb reflectors include semi-reflective coatings and/or films/sheets/plates (e.g., comprising a metal such as silver). In these embodiments, the front bulb reflectors can be disposed directly adjacent the front side of the bulb (e.g., opposite the rear reflector). As with the other embodiments, desirably, these front bulb reflectors form a sort of semicircle around the front portion of the bulb so as not to interfere with light being reflected back toward the reflector plate (e.g., rear reflector), but to reflect greater than or equal to 60% of bulb light (e.g., light from the bulb and light from the rear reflector that has been directed back through the bulb) back toward the reflector plate.

The bulb reflector can have, on one or both surfaces, reflecting structures that reflect light and extend radially about the surface. These structures can be configured to manage light differently depending upon the distance from the bulb to the structure. For example, the structures can have a different apex angle that decreases toward the center of the outward facing surface (i.e., surface 115 which faces away from the bulb 65, while surface 110 faces toward the bulb 65). The selection of the shape of the reflecting structures can be made to diverge and focus the reflected and transmitted light (lens effect). The reflecting structures or surface textures for both the inner and outer surfaces of the bulb reflector can be selected to optimize the bulb reflector's reflection, transmission, and haze properties. The inward facing surface can be smooth, textured (e.g., comprise no reflecting structures, but have a matte or similar light randomized finish with an average surface slope angle less than or equal to 10 degrees), and/or comprise reflecting structures. The reflecting structures of the front bulb reflector can also be optimized for the specific properties of back reflector panels 70. Examples include a back reflector panel 70 with either randomized or engineered textures or coatings.

Ranges disclosed herein are inclusive and combinable (e.g., ranges of "up to 25 wt %, or, more specifically, 5 wt % to 20 wt %", is inclusive of the endpoints and all intermediate values of the ranges of "5 wt % to 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The suffix "(s)" as used herein is intended to include both the singular and the plural of the term that it modifies, thereby including one or more of that term (e.g., the colorant(s) includes one or more colorants). The notation "±10%" means that the indicated measurement can be from an amount that is minus 10% to an amount that is plus 10% of the stated value. Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments and are not limited to the specific combination in which they are discussed.

While the front bulb reflectors 100, 300 have been described with reference to exemplary embodiments, it will be understood by those skilled in the art that various changes can be made and equivalents can be substituted for elements thereof without departing from the scope. In addition, many modifications can be made to adapt a particular situation or material to the above teachings without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A backlight assembly, comprising:
a bulb having a bulb first side and a bulb second side located on a side of the bulb opposite the first side;
a reflector plate disposed on the bulb first side;
a front bulb reflector disposed over the bulb second side, the front bulb reflector having a partially reflective member capable of reflecting greater than or equal to 60% of light from the bulb toward the reflector plate, and an inner surface on a reflector second side located opposite the reflector first side, wherein an overall geometry of the front bulb reflector is concave on the reflector second side and convex on the reflector first side; and
a diffuser plate disposed on a side of the front bulb reflector opposite the bulb, and comprising a ratio of bulb hiding difficulty of less than or equal to 0.35.

2. The backlight assembly of claim 1, wherein the ratio of bulb hiding difficulty is less than or equal to 0.3.

3. The backlight assembly of claim 1, having an absolute hiding power of less than or equal to 3% when viewed through the diffuser plate covering the plurality of front bulb reflectors.

4. The backlight assembly of claim 1, further comprising an additional film selected from the group consisting of prismatic film, light collimating film, diffusing film, reflective recycling light polarizer film, and combinations comprising at least one of the foregoing films.

5. The backlight assembly of claim 1, further comprising a plurality of the bulbs, wherein the front bulb reflector is positioned partially around each of the plurality of bulbs.

6. A backlight assembly, comprising:
a reflector plate;
a plurality of bulbs positioned in front of the reflector;
a front bulb reflector comprising
an outward facing surface curved over and positioned partially around each of the plurality of bulbs, the outward facing surface having a plurality of reflecting structures radially arranged upon the outward facing surface to reflect light towards the reflector plate;
an inner surface facing the plurality of bulbs; and
a diffuser plate positioned on a side of the front bulb reflector opposite the plurality of bulbs.

7. A backlight assembly comprising:
a bulb having a bulb first side and a bulb second side located on a side of the bulb opposite the first side;
a reflector plate disposed on the bulb first side;
a front bulb reflector disposed over the bulb second side, the front bulb reflector having an outward facing surface having a plurality of reflecting structures on a reflector first side, the plurality of reflecting structures capable of reflecting light from the bulb toward the reflector plate, and an inner surface on a reflector second side located opposite the reflector first side, wherein an overall geometry of the front bulb reflector is concave on the reflector second side and convex on the reflector first side; and
a diffuser plate disposed on a side of the front bulb reflector opposite the bulb, and comprising a ratio of bulb hiding difficulty of less than or equal to 0.35.

8. The backlight assembly of claim 7, wherein the ratio of bulb hiding difficulty is less than or equal to 0.3.

9. The backlight assembly of claim 7, further comprising an additional film selected from the group consisting of prismatic film, light collimating film, diffusing film, reflective recycling light polarizer film, and combinations comprising at least one of the foregoing films.

10. A backlight assembly comprising:
a bulb having a bulb first side and a bulb second side located on a side of the bulb opposite the first side;
a reflector plate disposed on the bulb first side;
a front bulb reflector disposed over the bulb second side, the front bulb reflector having an outward facing surface having a plurality of reflecting structures on a reflector first side, the plurality of reflecting structures capable of reflecting light from the bulb toward the reflector plate, and an inner surface on a reflector second side located opposite the reflector first side, wherein an overall geometry of the front bulb reflector is concave on the reflector second side and convex on the reflector first side; and having an absolute hiding power of less than or equal to 3% when viewed through a diffuser plate covering the plurality of front bulb reflectors.

11. A backlight assembly comprising:

a bulb having a bulb first side and a bulb second side located on a side of the bulb opposite the first side;

a reflector plate disposed on the bulb first side;

a front bulb reflector disposed over the bulb second side, the front bulb reflector having an outward facing surface having a plurality of reflecting structures on a reflector first side, the plurality of reflecting structures capable of reflecting light from the bulb toward the reflector plate, and an inner surface on a reflector second side located opposite the reflector first side, wherein an overall geometry of the front bulb reflector is concave on the reflector second side and convex on the reflector first side; and wherein an apex angle changes across the first side.

12. The backlight assembly of claim 11, wherein the apex angle decreases toward a center of the first side.

13. A backlight assembly comprising:

a bulb having a bulb first side and a bulb second side located on a side of the bulb opposite the first side;

a reflector plate disposed on the bulb first side;

a front bulb reflector disposed over the bulb second side, the front bulb reflector having an outward facing surface having a plurality of reflecting structures on a reflector first side, the plurality of reflecting structures capable of reflecting light from the bulb toward the reflector plate, and an inner surface on a reflector second side located opposite the reflector first side, wherein an overall geometry of the front bulb reflector is concave on the reflector second side and convex on the reflector first side; and wherein the reflecting structures have an apex angle of 60 to 120 degrees.

14. A backlight assembly comprising:

a bulb having a bulb first side and a bulb second side located on a side of the bulb opposite the first side;

a reflector plate disposed on the bulb first side;

a front bulb reflector disposed over the bulb second side, the front bulb reflector having an outward facing surface having a plurality of reflecting structures on a reflector first side, the plurality of reflecting structures capable of reflecting light from the bulb toward the reflector plate, and an inner surface on a reflector second side located opposite the reflector first side, wherein an overall geometry of the front bulb reflector is concave on the reflector second side and convex on the reflector first side; and wherein the front bulb reflector further comprises a trough portion, wherein the reflecting structures are selected from a group consisting of prisms and parabolas.

15. The backlight assembly of claim 14, wherein the reflecting structures are prisms.

16. The backlight assembly of claim 14, wherein the reflecting structures are parabolas.

* * * * *